United States Patent
Mullappilly et al.

(10) Patent No.: US 12,380,677 B2
(45) Date of Patent: Aug. 5, 2025

(54) SYSTEM AND METHOD OF OPEN-WORLD SEMI-SUPERVISED SATELLITE OBJECT DETECTION

(71) Applicant: Mohamed bin Zayed University of Artificial Intelligence, Abu Dhabi (AE)

(72) Inventors: Sahal Shaji Mullappilly, Abu Dhabi (AE); Abhishek Singh Gehlot, Abu Dhabi (AE); Hisham Cholakkal, Abu Dhabi (AE); Rao Muhammad Anwer, Abu Dhabi (AE); Fahad Shahbaz Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 314 days.

(21) Appl. No.: 18/323,808

(22) Filed: May 25, 2023

(65) Prior Publication Data

US 2024/0395015 A1  Nov. 28, 2024

(51) Int. Cl.
  *G06V 10/764*  (2022.01)
  *G06V 10/52*  (2022.01)
  (Continued)

(52) U.S. Cl.
  CPC ............ *G06V 10/764* (2022.01); *G06V 10/52* (2022.01); *G06V 10/766* (2022.01); *G06V 10/82* (2022.01); *G06V 10/84* (2022.01)

(58) Field of Classification Search
  None
  See application file for complete search history.

(56) References Cited

U.S. PATENT DOCUMENTS 12,315,255 B2 *  5/2025  Baker ................ G06V 10/774
2022/0155079 A1 *  5/2022  Chidlovskii ............ G01V 3/08

FOREIGN PATENT DOCUMENTS

CN  107064903 A  8/2017

OTHER PUBLICATIONS

Wu et al. "Rotation-aware representation learning for remote sensing image retrieval," Information Sciences 572 (2021) 404-423 (Year: 2021).*

(Continued)

*Primary Examiner* — Soo Shin
(74) *Attorney, Agent, or Firm* — Oblon, McClelland, Maier & Neustadt, L.L.P.

(57) ABSTRACT

A system and method of open-world semi-supervised satellite object detection involves a machine learning engine configured with a training component and an inference component. The method of object detection detects objects in satellite imagery represents a solution for difficult challenges of arbitrary orientations, wide variation in object sizes, large number of densely packed objects, and highly complex background. A transformer network detects unknown objects in the satellite image. The transformer network includes a rotation-aware pyramidal pseudo-labeling operation that captures scale-specific pyramidal features at oriented box regions for pseudo-labeling unknown objects in the satellite image. A semi-supervised learning pipeline learns a new set of object classes to be detected. A prediction head outputs the satellite image annotated with a predicted object class for an unknown object. The inference component obtains object queries for a test satellite image, predicts labels for objects from known classes, predicts oriented boxes for the objects.

20 Claims, 28 Drawing Sheets

(51) Int. Cl.
    *G06V 10/766*     (2022.01)
    *G06V 10/82*     (2022.01)
    *G06V 10/84*     (2022.01)

(56) References Cited

OTHER PUBLICATIONS

Zhu et al. "RFA-Net: Reconstructed Feature Alignment Network for Domain Adaptation Object Detection in Remote Sensing Imagery," IEEE Journal of Selected Topics in Applied Earth Observations and Remote Sensing, vol. 15, 2022 (Year: 2022).*

Sun et al., "Unsupervised deep hashing through learning soft pseudo label for remote sensing image retrieval," Knowledge-Based Systems 239 (2022) 107807 (Year: 2022).*

Matthew Inkawhich, et al., "Self-Trained Proposal Networks for the Open World", Computer Vision and Pattern Recognition (cs.CV), arXiv:2208.11050v2 [cs.CV], Jan. 20, 2023, pp. 1-19.

Junbo Yin, et al., "Semi-supervised 3D Object Detection with Proficient Teachers", Computer Vision and Pattern Recognition (cs.CV), arXiv:2207.12655v1 [cs.CV], Jul. 26, 2022, pp. 1-16.

Jernej Puc, "Semi-supervised learning in satellite image classification: Experimenting with MixMatch and Earth observation data", Sentinel Hub Blog, https://medium.com/sentinel-hub/semi-supervised-learning-in-satellite-image-classification-e0874a76fc61, Feb. 18, 2020, 17 pages.

Jian Yao, et al., "Semi-Supervised Learning Based Object Detection in Aerial Imagery", IEEE Computer Society Conference on Computer Vision and Pattern Recognition (CVPR'05), Jul. 25, 2005, 6 pages.

* cited by examiner

INPUT    HIGH

INPUT    MEDIUM

INPUT　　　　　　　　　　　HIGH

INPUT　　　　　　　　　　　MEDIUM

INPUT SMALL

INPUT MEDIUM

INPUT SMALL

INPUT MEDIUM

T1 : person T3 : skis

T1 : person T2 : bench, chair T3: tennis racket T4: bottle

SYSTEM AND METHOD OF OPEN-WORLD SEMI-SUPERVISED SATELLITE OBJECT DETECTION

BACKGROUND

Technical Field

The present disclosure is directed to a system and method of object detection using an object detection transformer, particularly object detection in satellite images having hundreds of object instances per image. The object detection transformer is trained for open-world satellite object detection to detect both known and unknown classes in all tasks. The object detection transformer constructs axis-oriented pyramidal pseudo-labeling of unknown objects. The object detection transformer uses a semi-supervised incremental learning approach.

Description of the Related Art

Satellite imagery can be obtained from optical satellites. Optical satellites can include a single geostationary satellite, or a constellation of multiple optical satellites. FIG. 1 illustrates types of satellites above the Earth. In the case of geostationary satellites 114, a single satellite, at a high altitude and moving at the same angular velocity as the rotation of the Earth's surface, provides permanent coverage over a large area.

Satellite constellations can be deployed as a matrix of satellites in medium Earth orbit 104 (MEO) and low Earth orbit 106 (LEO). In these configurations, the coverage area provided by a single satellite only covers a small area that moves as the satellite travels at the high angular velocity needed to maintain its orbit. Many MEO 104 or LEO 106 satellites are needed to maintain continuous coverage over an area. The satellites in the satellite constellation communicate with ground stations 108 on the Earth's surface 102. The ground stations 108 can be configured with communications and computer systems in order to perform image processing tasks as satellite images are being received. The communications system includes one or more of a transceiver, transmitter, receiver, as well as communications circuitry. The computer system can be configured for image processing tasks including, but not limited to image conversion and storage, image recognition, semantic image segmentation, and object detection, where object detection is the first subject of the present application. Image conversion tasks can include converting signals into image data and converting the image data into a preferred format.

FIG. 2 is an exemplary satellite imaging device. A satellite camera may capture panchromatic, multispectral, and/or hyper spectral images. Satellite cameras capture electromagnetic waves through satellite camera systems. Optical satellites are configured with various types of optical sensors 202 and lenses 204 that can provide multi-resolution and multi-source data. Because optical satellites are elevated above the Earth, they are considered as remote sensors. An example high-resolution earth observation satellite may be equipped with CCD sensors providing resolution panchromatic band (PAN) of a certain resolution and multispectral band images (blue, green, red, and near-infrared) of a certain resolution and swath width. The optical sensors in a constellation can provide wide coverage, fine detail, intensive monitoring, and timely image acquisition over varying lighting conditions. In turn, geospatial datasets can be derived for elevation models, global layers and grids.

Remote sensing technology continues to significantly evolve and produce an ever-increasing volume of data. The large volume of satellite data imposes a unique challenge in the detection of objects. These challenges include a large number of instances per image, high variations in object scale and density, and highly complex backgrounds. Moreover, different from natural images, satellite object detection requires predicting oriented bounding boxes since objects of interest can be distributed with arbitrary orientation. Further, it is hard to pre-define all possible object classes that are likely to be encountered in remote sensing detection and obtain oriented bounding boxes for all of them. There is a need for an object detection paradigm for very high-resolution (VHR) satellite imagery; oriented as open-world object detection for satellite imagery (OWOD-S). The object detection paradigm must address surmountable challenges including, high object density and the requirement of predicting oriented boxes for unknown objects.

Localizing objects in satellite imagery is a challenging task due to (i) arbitrary orientations (ii) wide variation in object sizes, (iii) large number of densely packed objects, and (iv) highly complex background, etc. See Gong Cheng, Jiabao Wang, Ke Li, Xingxing Xie, Chunbo Lang, Yanqing Yao, and Junwei Han. Anchor-free oriented proposal generator for object detection. *IEEE Transactions on Geoscience and Remote Sensing*, 60:1-11, 2022; Syed Waqas Zamir, Aditya Arora, Akshita Gupta, Salman Khan, Guolei Sun, Fahad Shahbaz Khan, Fan Zhu, Ling Shao, Gui-Song Xia, and Xiang Bai. isaid: A large-scale dataset for instance segmentation in aerial images. In *Proceedings of the IEEE/CVF Conference on Computer Vision and Pattern Recognition Workshops*, pages 28-37, 2019; Xia et al.; Abdulaziz Amer Aleissaee, Amandeep Kumar, Rao Muhammad Anwer, Salman Khan, Hisham Cholakkal, Gui-Song Xia, et al. Transformers in remote sensing: A survey. *arXiv preprint arXiv:* 2209.01206, 2022; Hang Gong, Tingkui Mu, Qiuxia Li, Haishan Dai, Chunlai Li, Zhiping He, WenjingWang, Feng Han, Abudusalamu Tuniyazi, Haoyang Li, et al. Swin-transformer-enabled yolov5 with attention mechanism for small object detection on satellite images. *Remote Sensing*, 14(12): 2861, 2022; and Adam Van Etten. You only look twice: Rapid multiscale object detection in satellite imagery. *arXiv preprint arXiv:* 1805.09512, 2018, each incorporated herein by reference in their entirety. Recent approaches employ a hybrid strategy combining the advantages of transformers and CNNs in both two-stage and single-stage frameworks. See Qingyun Li, Yushi Chen, and Ying Zeng. Transformer with transfer cnn for remote-sensing-image object detection. *Remote Sensing*, 14(4): 984, 2022; Xulun Liu, Shiping Ma, Linyuan He, Chen Wang, and Zhe Chen. Hybrid network model: Transconvnet for oriented object detection in remote sensing images. *Remote Sensing*, 14(9): 2090, 2022; Xiangkai Xu, Zhejun Feng, Changqing Cao, Mengyuan Li, Jin Wu, Zengyan Wu, Yajie Shang, and Shubing Ye. An improved swin transformer-based model for remote sensing object detection and instance segmentation. *Remote Sensing*, 13(23): 4779, 2021; and Yongbin Zheng, Peng Sun, Zongtan Zhou, Wanying Xu, and Qiang Ren. Adt-det: Adaptive dynamic refined single-stage transformer detector for arbitrary-oriented object detection in satellite optical imagery. *Remote Sensing*, 13(13): 2623, 2021, each incorporated herein by reference in their entirety. Oriented R-CNN proposes a two-stage detector having oriented RPN with two-stage refining for arbitrary-oriented object detection. See Xingxing Xie, Gong Cheng, Jiabao Wang, Xiwen Yao, and Junwei Han. Oriented r-cnn for object detection. In *Proceedings of the IEEE/CVF International Conference on*

*Computer Vision(ICCV)*, pages 3520-3529 October 2021, incorporated herein by reference in its entirety. ReDet proposes a two-stage framework consisting of rotation-equivariant backbone and Rotation-invariant RoI Align. See Jiaming Han, Jian Ding, Nan Xue, and Gui-Song Xia. Redet: A rotation-equivariant detector for aerial object detection. In *Proceedings of the IEEE/CVF Conference on Computer Vision and Pattern Recognition (CVPR)*, pages 2786-2795 June 2021, incorporated herein by reference in its entirety. The state-of-the-art results on DOTA dataset is achieved by Wang et al. by adapting the standard vision transformer to remote sensing domain using rotated window attention. See Xia et al.; and Di Wang, Qiming Zhang, Yufei Xu, Jing Zhang, Bo Du, Dacheng Tao, and Liangpei Zhang. Advancing plain vision transformer towards remote sensing foundation model. *arXiv preprint arXiv:* 2208.03987, 2022, each incorporated herein by reference in their entirety.

Open-world object detection (ORE) in natural images has gained popularity in research due to its applicability in real-world scenarios. ORE introduces an open-world object detector based on the two-stage Faster R-CNN. See Joseph et al.; and Shaoqing Ren, Kaiming He, Ross Girshick, and Jian Sun. Faster r-cnn: Towards real-time object detection with region proposal networks. *Advances in neural information processing systems*, 28, 2015, each incorporated herein by reference in their entirety. Since unknown objects are not annotated for training in the open-world paradigm, ORE utilizes an auto-labeling step to obtain a set of pseudo-unknowns for training. It generates class-agnostic proposals from a region proposal network (RPN) and performs auto-labeling on it. The OW-DETR introduces an end-to-end transformer-based framework for open-world object detection with attention-driven pseudo-labeling, novelty classification and an objectness branch to triumph over the OWOD challenges faced by ORE. OWDETR achieves state-of-the-art performance on both unknown recall and incremental object detection on COCO benchmark. See Tsung-Yi Lin, Michael Maire, Serge Belongie, James Hays, Pietro Perona, Deva Ramanan, Piotr Dollár, and C Lawrence Zitnick. Microsoft coco: Common objects in context. In *European conference on computer vision*, pages 740-755. Springer, 2014, incorporated herein by reference in its entirety. Open-world object detection has thus far been focused on natural images. There is a need for open-world object detection for satellite images.

Conventional object detectors are built upon the assumption that the model will only encounter known object classes which it has come across while training. A current approach to object detection is referred to as open-world object detection (OWOD), where the objective is to detect known and unknown objects and then incrementally learn these unknown objects when introduced with labels in the later subsequent tasks. See Akshita Gupta, Sanath Narayan, KJ Joseph, Salman Khan, Fahad Shahbaz Khan, and Mubarak Shah. Ow-detr: Open-world detection transformer. In *CVPR*, 2022; and K J Joseph, Salman Khan, Fahad Shahbaz Khan, and Vineeth N Balasubramanian. Towards open world object detection. In *Proceedings of the IEEE/CVF Conference on Computer Vision and Pattern Recognition (CVPR 2021)*, 2021, each incorporated herein by reference in their entirety. Here, the newly identified unknowns are first forwarded to a human oracle, which can label new classes of interest from the set of the unknowns. The model then continues to learn and update its understanding with the new classes without retraining on the previously known data from scratch. Thus, the model is able to identify and subsequently learn new classes of objects in an incremental way when new data arrives.

Although the conventional open-world object detection (OWOD) provides flexibility to detect unknown object categories and then incrementally learn new object categories, the general problem of incremental learning of new classes comes with the need to be trained in a fully supervised setting. See Enrico Fini, Victor G Turrisi da Costa, Xavier Alameda-Pineda, Elisa Ricci, Karteek Alahari, and Julien Mairal. Self-supervised models are continual learners. In *Proceedings of the IEEE/CVF Conference on Computer Vision and Pattern Recognition*, 2022, incorporated herein by reference in its entirety. Supervised training in the case of satellite images is not practical. In particular, supervised training incurs an unrealistic assumption that an interacting human oracle is going to provide annotations for a large amount of high-resolution satellite data typically comprising a high number of instances per image (for example, greater than 100 instances in an image). The annotation problem is especially difficult because satellite images require oriented box annotations, in the presence of background clutter and small object size, for all incremental training data.

An object of the present disclosure is to provide an open-world object method, detector and system to detect objects in satellite imagery having challenges of arbitrary orientations, wide variation in object sizes, large number of densely packed objects, and highly complex background.

SUMMARY

An aspect is a semi-supervised satellite image object detection system, that can include an input device to input at least one satellite image; processing circuitry of a machine learning engine configured with a satellite object detection training component and an object detection inference component, wherein the object detection training component includes a transformer network that detects at least one unknown object in the at least one satellite image, wherein the transformer network includes a rotation-aware pyramidal pseudo-labeling operation that captures scale-specific pyramidal features at oriented box regions for pseudo-labeling unknown objects in the at least one satellite image; a semi-supervised learning pipeline to learn, by incremental learning, a new set of object classes to be detected; a prediction head that outputs the at least one satellite image annotated with a predicted object class for an unknown object, wherein the input device receives a test satellite image, and the object detection inference component obtains object queries for the test satellite image, predicts labels for objects from known classes, and predicts oriented boxes for the objects; and an output device that outputs the predicted labels and corresponding oriented boxes.

A further aspect is method of semi-supervised object detection by a satellite object detection system having processing circuitry of a machine learning engine configured with a satellite object detection training component and an object detection inference component. The method can include inputting, via an input device, at least one satellite image; detecting, via a transformer network, at least one unknown object in the at least one satellite image, including capturing, via a rotation-aware pyramidal pseudo-labeling operation, scale-specific pyramidal features at oriented box regions for pseudo-labeling unknown objects in the at least one satellite image; incrementally learning, via a semi-supervised learning pipeline, a new set of object classes to be detected; outputting, via a prediction head, the at least one satellite image annotated with a predicted object class for an unknown object; receiving, via the input device, a test satellite image; obtaining, via the object detection inference component, object queries for the test satellite image, predicts labels for objects from known classes; predicting, via the object detection inference component, oriented boxes for the objects; and outputting, via an output device, the predicted labels and corresponding oriented boxes.

A further aspect is a non-transient storage medium storing program instructions, which when executed, perform a method of semi-supervised object detection by a satellite image object detection system having processing circuitry of a machine learning engine configured with a satellite object detection training component and an object detection inference component. The method can include inputting, via an input device, at least one satellite image; detecting, via a transformer network, at least one unknown object in the at least one satellite image, including capturing, via a rotation-aware pyramidal pseudo-labeling operation, scale-specific pyramidal features at oriented box regions for pseudo-labeling unknown objects in the at least one satellite image; incrementally learning, via a semi-supervised learning pipeline, a new set of object classes to be detected; outputting, via a prediction head, the at least one satellite image annotated with a predicted object class for an unknown object; receiving, via the input device, a test satellite image; obtaining, via the object detection inference component, object queries for the test satellite image, predicts labels for objects from known classes; predicting, via the object detection inference component, oriented boxes for the objects; and outputting, via an output device, the predicted labels and corresponding oriented boxes.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
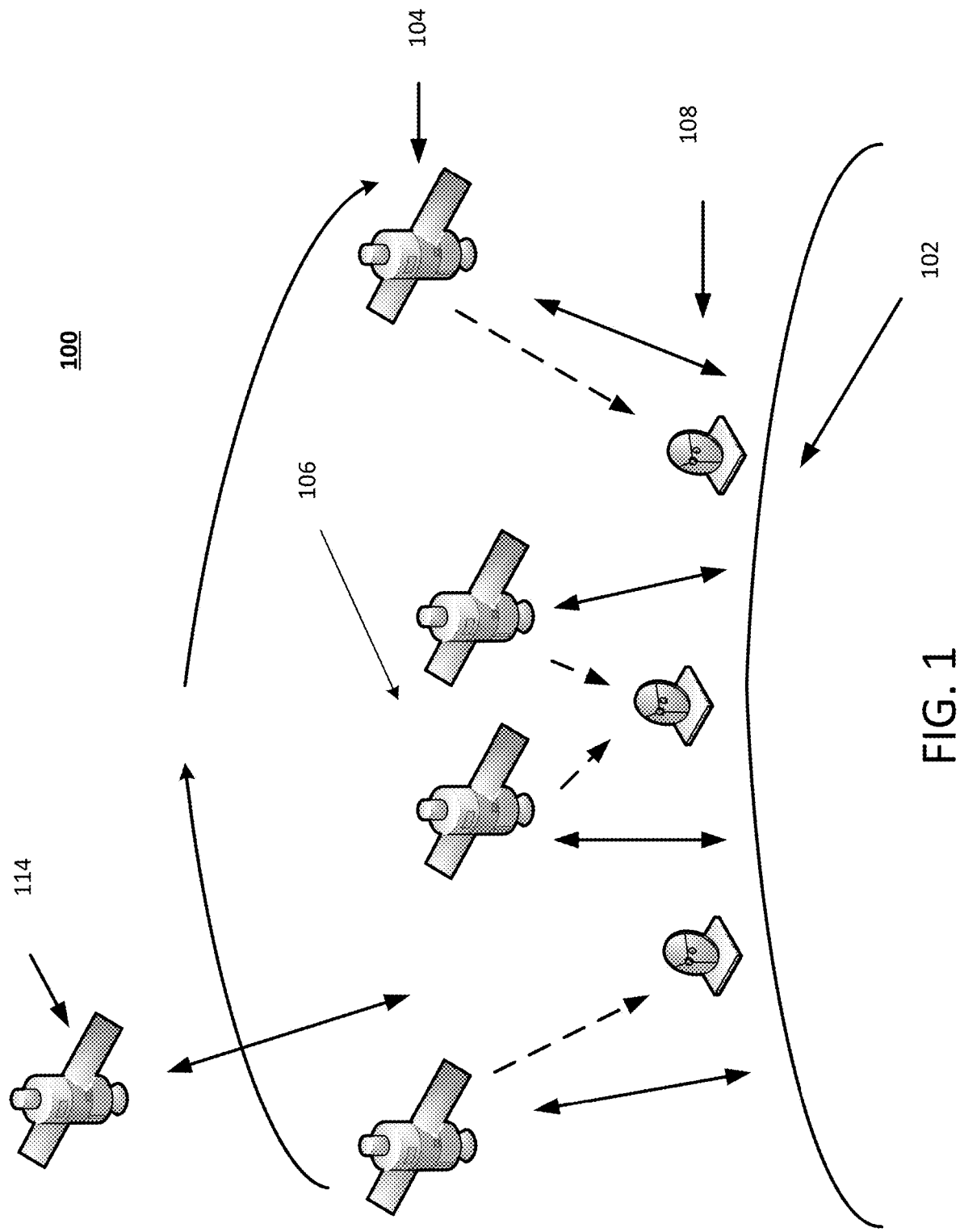
FIG. 1 is a typical satellite system.
Figure 2:
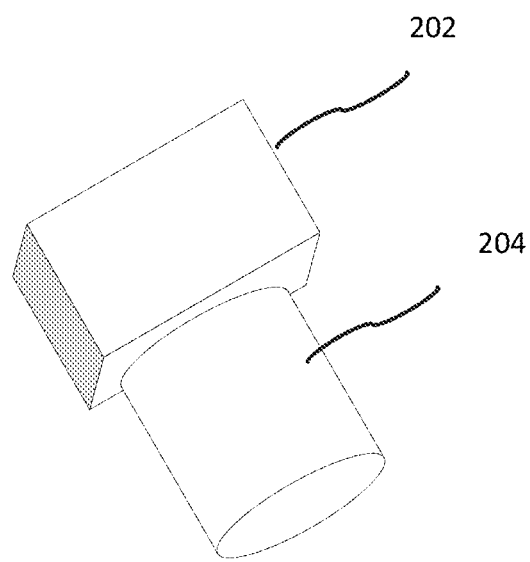
FIG. 2 is an exemplary satellite imaging device.

In the drawings, like reference numerals designate identical or corresponding parts throughout the several views.

Further, as used herein, the words "a," "an" and the like generally carry a meaning of "one or more," unless stated otherwise. The drawings are generally drawn to scale unless specified otherwise or illustrating schematic structures or flowcharts.

One object of the presently disclosed object detection transformer includes learning annotations only for a certain portion of data used for incremental learning. The present Open-world Semi-supervised Oriented satellite object detection transformer, named OSO-DETR, with the following key contributions, can be viewed as an improvement over OW-DETR, particularly in the case of satellite object detection. The present object detection transformer provides a solution for the open-world object detection problem (OWOD-S) for the field of satellite imagery, and includes an OWOD-S split for the DOTA dataset based on the number of object instances in images. The DOTA dataset is discussed in Gui-Song Xia, Xiang Bai, Jian Ding, Zhen Zhu, Serge Belongie, Jiebo Luo, Mihai Datcu, Marcello Pelillo, and Liangpei Zhang. Dota: A large-scale dataset for object detection in aerial images. In *Proceedings of the IEEE conference on computer vision and pattern recognition*, pages 3974-3983, 2018, incorporated herein by reference in its entirety. The present object detection transformer incorporates a rotation-aware Pyramidal Pseudo Labeling (RaPPL) scheme to capture scale-specific pyramidal features at oriented box regions for pseudo-labeling unknown objects. Here, object detection is scaled into groups based on the predicted box sizes, and then an objectness score is computed by taking backbone features at corresponding resolution, i.e., deeper layer for larger objects and shallower for small objects. The present object detection transformer incorporates an open-world semi-supervised object detection setting that alleviates the requirement that annotations are available for all data incoming at incremental learning stages. A model can be trained to detect a newly introduced set of categories by using partially annotated data, in a semi-supervised incremental learning setting. In the semi-supervised incremental learning setting, the present OSO-DETR is trained along with its detached (frozen) copy and a mapping network to learn representations (object query embeddings) from labeled and unlabeled data.

Comprehensive experiments using an OWOD-S split demonstrate the effectiveness of the present OSO-DETR for open-world satellite object detection. The present OSO-DETR achieves consistent improvement in the detection performance for both the 'known' and 'unknown' classes in all the tasks, compared to the baseline. The present OSO-DETR achieves an absolute 5% gain in 'unknown' recall for the first task over the baseline. The present OSO-DETR was evaluated in a semi-supervised OWOD-S setting and its effectiveness was validated in different proportions of partial annotations during the incremental learning stage. On the challenging settings with just 10% and 25% annotated data, the semi-supervised incremental learning shows 17.2% and 16.4% mAP improvements over OW-DETR without hampering with the performance on previously known classes, thus providing a better incremental learning setup. Lastly, the generalizability of the OSO-DETR is demonstrated by evaluation in the OWOD setting for natural images. On the MS COCO OWOD split of Gupta et al., the presence OSO-DETR provides an absolute 3% gain in the unknown object recall over the state-of-the-art OW-DETR. Moreover, by using only 50% annotated data, OSO-DETR achieves performance on par with state-of-the-art OW-DETR evaluated on the task-2.

Preliminaries

In embodiments, $\mathcal{D}^t = \{\mathcal{I}^t, \mathcal{Y}^t\}$ is a dataset containing N images $\mathcal{I}^t = \{I_1, I_2, \ldots, I_N\}$ with corresponding labels $\mathcal{Y}^t = (Y_1, Y_2, \ldots, Y_N)$. In the present satellite image object detection, each image label $Y_i = \{\psi_1, \psi_2, \ldots, \psi_k\}$ is a set of arbitrarily oriented box annotations for all k object instances in the image. In particular, the instance annotation $\psi_k = [l_k, o_k^x, o_k^y, h_k, w_k, a_k]$ where $l_k \in \mathcal{K}^t$ is the class label for a bounding box having a center at $(o_k^x, o_k^y)$, width $w_k$, height $h_k$ and oriented at an angle $\alpha_k$ with respect to the horizontal axis. In open world object detection, $\mathcal{D}^t$ is a progressive dataset having only $\mathcal{K}^t = \{C_1, C_2, \ldots, C_n\}$ known object classes at time t. A model trained on these $\mathcal{K}^t$ known classes can not only detect known classes but can also detect (localize and classify) objects from unknown classes $\mathcal{U} = \{C_{n+1}, \ldots\}$ by predicting an unknown class label for all unknown class instances. The unknown instances identified by the model are then forwarded to a human oracle for annotating new classes of interest. The model $\mathcal{M}$ is then trained incrementally with these newly annotated $N_s$ images containing novel classes, to detect all $\mathcal{K}^{t+1}$ classes without forgetting previously known $\mathcal{K}^t$ categories.

On the other hand, it is laborious and time-consuming for the human oracle to obtain bounding box annotations for all training images used for incremental learning, especially in the case of satellite images which have hundreds of object instances per image. Hence, the present OSO-DETR involves a semi-supervised open-world object detection formulation where only a partial set of images ($N_s$) are annotated by the human oracle and the remaining $N_u$ images are unlabeled. So, during incremental learning, the model utilizes both labeled and unlabeled sets of training images ($N_s + N_u$) to learn about the new $\mathcal{K}^{t+1}$ classes without forgetting previously known $\mathcal{K}^t$ classes.

Figure 3A:
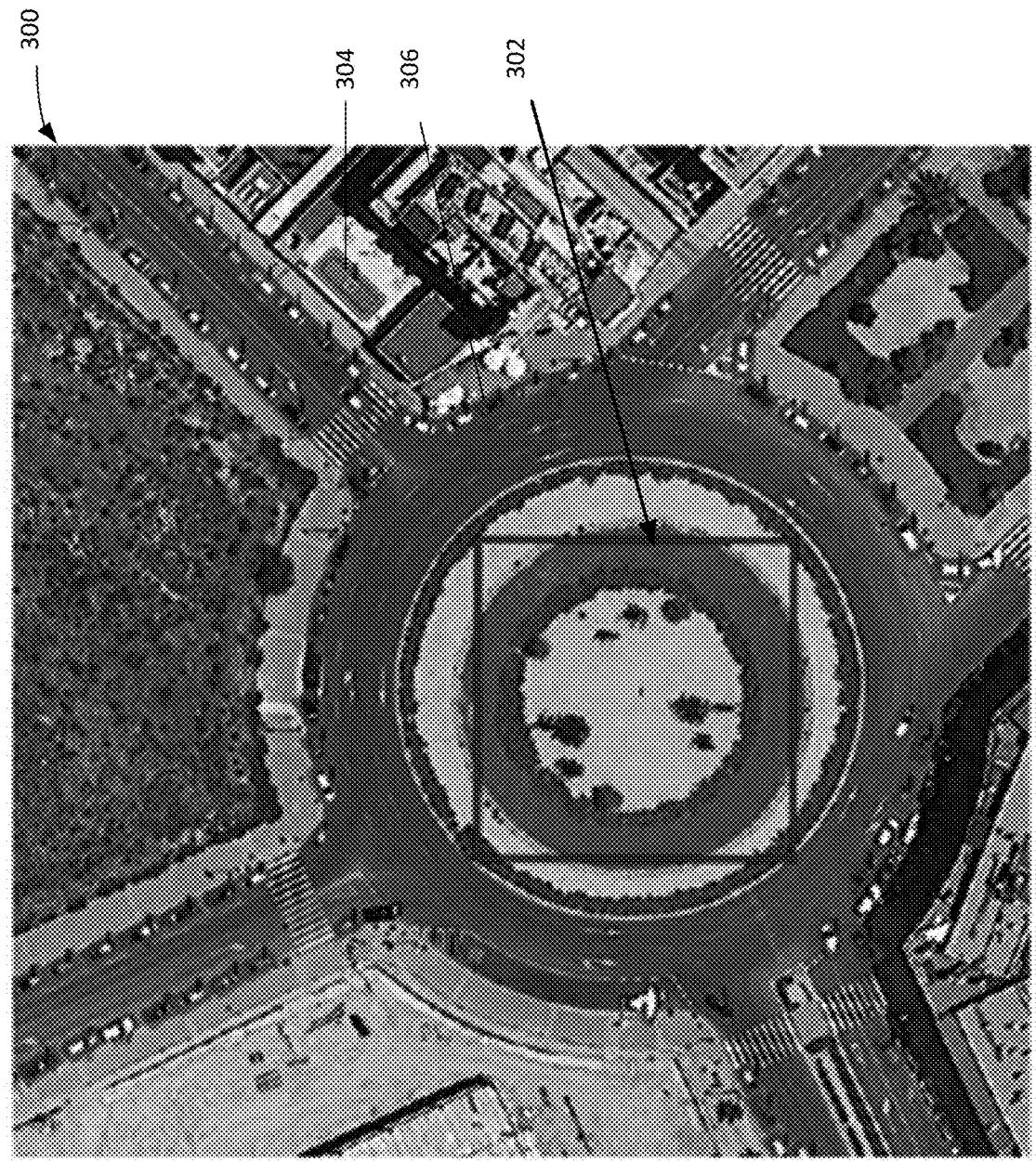
FIGS. 3A, 3B illustrate open-world object detection.
Figure 3B:
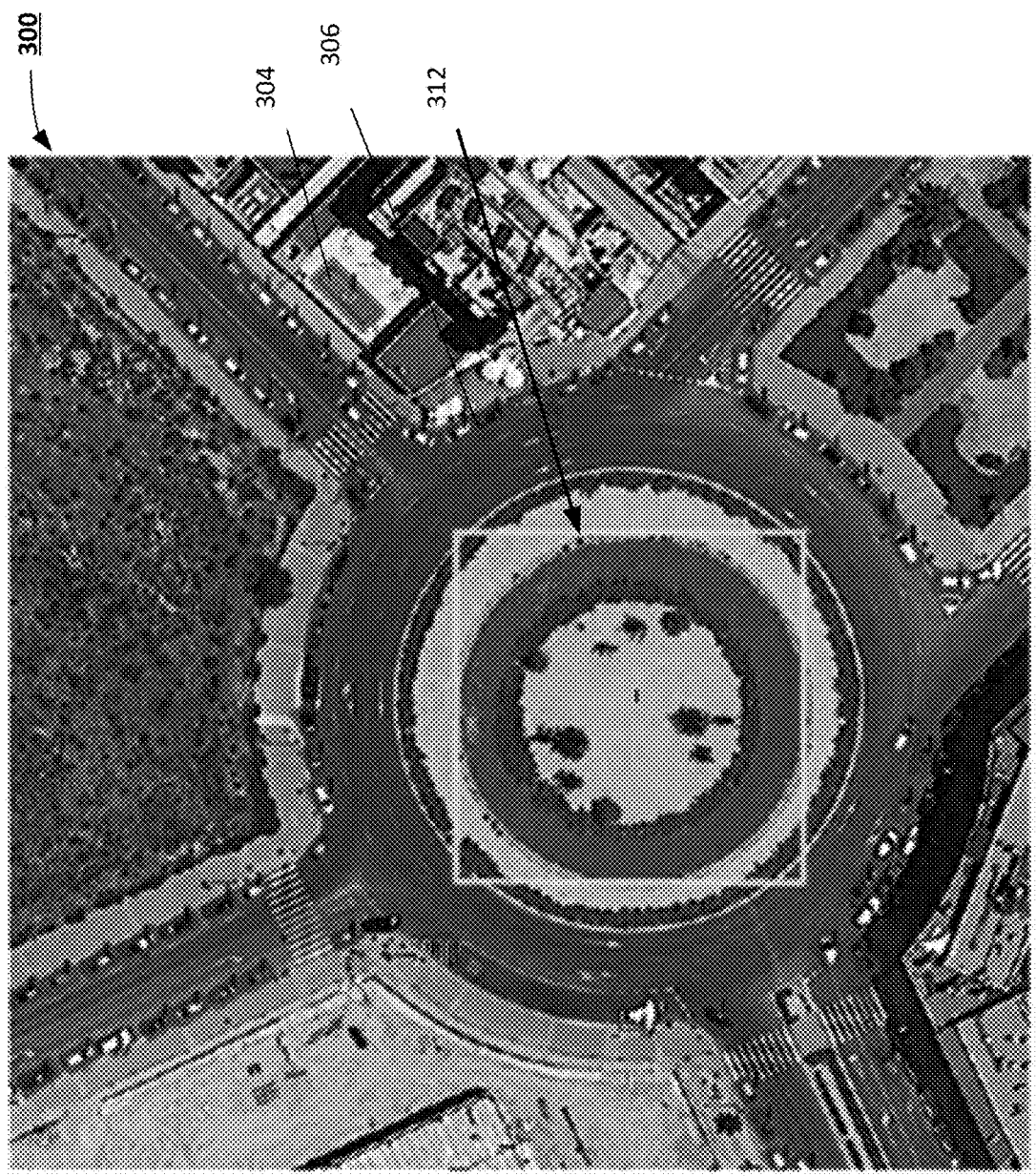

FIGS. 3A, 3B illustrate detection performance of the OSO-DETR in the open-world semi-supervised detection settings. Open-world semi-supervised object detection results are for two phases of a learning pipeline. In FIG. 3A, in a first phase, known objects such as small vehicle 306 and swimming pool 304 are detected while simultaneously detecting an unknown object 302. In FIG. 3B, in a second phase, the model receives only partially annotated data and incrementally learns to detect newly introduced roundabout category 312 without hampering detection quality of previously known categories of small vehicle 306 and swimming pool 304.

Baseline Framework

A baseline framework is built upon the OW-DETR proposed for natural images. It comprises a backbone network, transformer encoder-decoder architecture employing deformable attention, box prediction heads, and objectness and novelty classification branches to distinguish unknown objects from known and background regions. Here, the transformer decoder takes a set of learnable object queries as input and employs interleaved cross- and self-attention modules to obtain a set of object query embeddings. These object query embeddings are used by the prediction head for box predictions as in Xizhou Zhu, Weijie Su, Lewei Lu, Bin Li, Xiaogang Wang, and Jifeng Dai. Deformable detr: Deformable transformers for end-to-end object detection. *arXiv preprint arXiv:* 2010.04159, 2020, incorporated herein by reference in its entirety.

Different from the OW-DETR that predicts axis-parallel bounding boxes in natural images, a baseline framework for satellite object detection predicts oriented bounding boxes along object directions. For oriented object detection, the baseline framework incorporates an additional angle prediction head in the baseline framework along with its standard bounding box prediction heads. Oriented bounding boxes of potential unknown objects are selected through a pseudo-labeling scheme and a classifier learns to categorize these potential unknown object query embeddings as a single unknown class. Here, potential unknown objects are identified based on average activations at a selected layer (C4 of ResNet50) of the backbone feature map at regions corresponding to predicted box locations. Among all potential unknown object boxes, only boxes that are non-overlapping with the known ground-truth boxes are considered pseudo labels for potential unknowns. A binary class-agnostic objectness branch learns to distinguish object query embeddings of known and potential unknown objects from background regions. In addition, a novelty classification branch having an unknown class as an additional class is learned along with $\mathcal{K}^t$ known classes.

This baseline framework has limitations. (i) As discussed above, the baseline framework employs a pseudo-labeling scheme where only single-scale features from the backbone are utilized, ignoring multi-scale information. This is particularly sub-optimal in the case of satellite images that typically exhibit extreme scale variations among different categories. For instance, a single satellite image (see FIG. 3A) can contain two different object category instances (small vehicle 306 and harbor) having an extreme relative scale difference of over 1000 times between them in terms of their respective bounding-box areas, thereby causing problems for accurate unknown pseudo-labeling. (ii) Conventional state-of-the-art open-world detection frameworks for natural images typically require bounding box supervision for all images used during the incremental learning of novel classes. This is also the case for the baseline framework that requires oriented bounding box annotations for all images during the incremental learning of novel categories. This is extremely problematic since it requires considerable annotation efforts for the subsequent task data, especially in the case of satellite images where hundreds of oriented bounding boxes need to be annotated in each training image. The present OSO-DETR collectively addresses both the above issues in a single framework.

Method

The present OSO-DETR framework adds two key characteristics for an open-world detection framework for satellite images.

Axis-oriented Pyramidal Pseudo-labeling: As discussed earlier, the baseline framework utilizes only a single-scale feature from the backbone for pseudo-labeling of the unknown objects. However, such a single-scale unknown pseudo-labeling is problematic in the case of satellite objects that exhibit large scale-variation and background clutter, compared to natural objects. To alleviate the issues caused by large-scale variations and background clutter, an axis-oriented pyramidal pseudo-labeling of unknown objects is constructed where backbone features at different scales are utilized.

Semi-supervised incremental Learning in Open-world detection: While the above requisite focuses on capturing scale information for pseudo-labeling, a second characteristic aims at reducing the supervision level for open-world object detection. Conventional open-world object detection formulation in natural images and the baseline framework require box annotations for all images used for incremental learning of novel classes. This is sub-optimal especially in the case of satellite images having hundreds of oriented bounding boxes in each training image. To overcome the assumption that annotations are readily available for entirety of new data when new classes are introduced in the incremental stages, a semi-supervised incremental learning approach is incorporated for subsequent tasks. The present OSO-DETR addresses both above objectives in a single framework.

Overall Architecture

Figure 4:
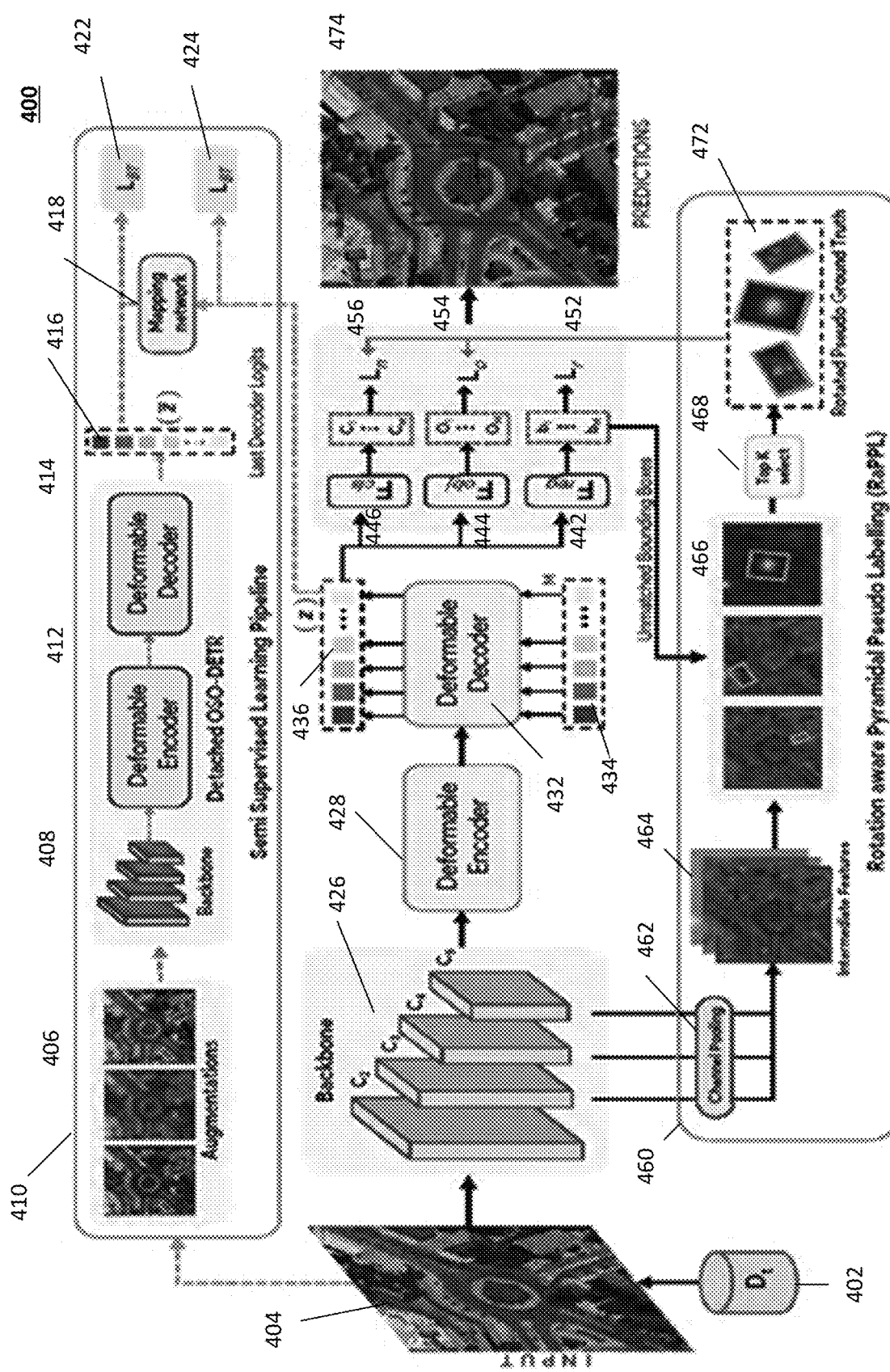
FIG. 4 is a block diagram of an architecture for an open-world semi-supervised oriented satellite image object detection transformer, in accordance with an exemplary aspect of the disclosure.
Figure 5A:
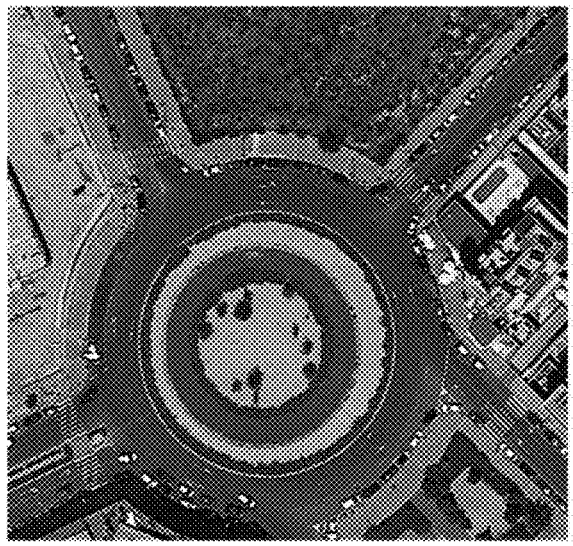
FIGS. 5A-5L illustrate qualitative results showing the effectiveness of RaPPL strategy.
Figure 5A:
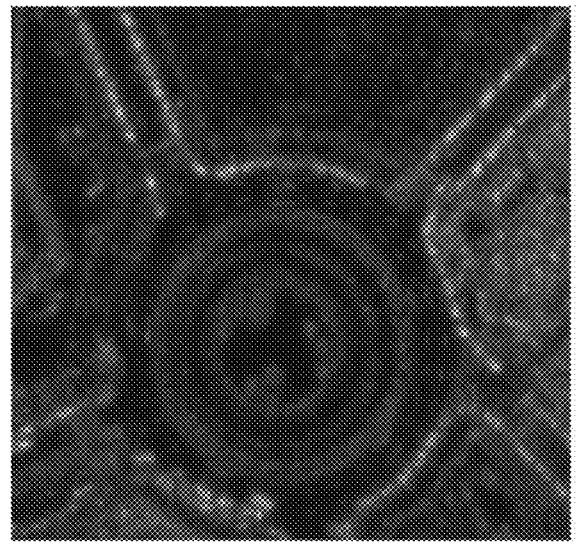
Figure 5B:
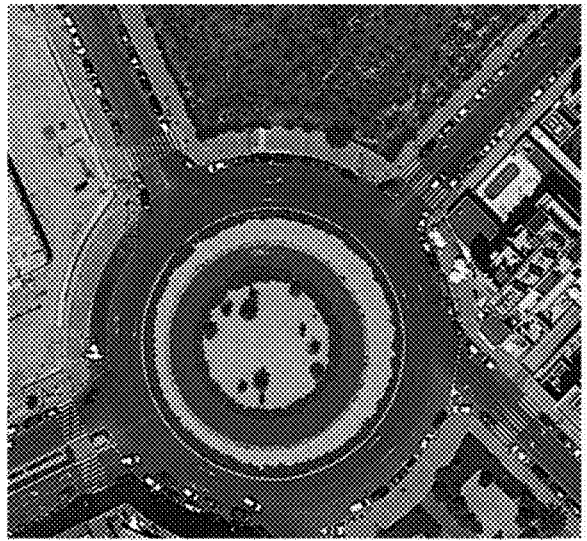
Figure 5B:
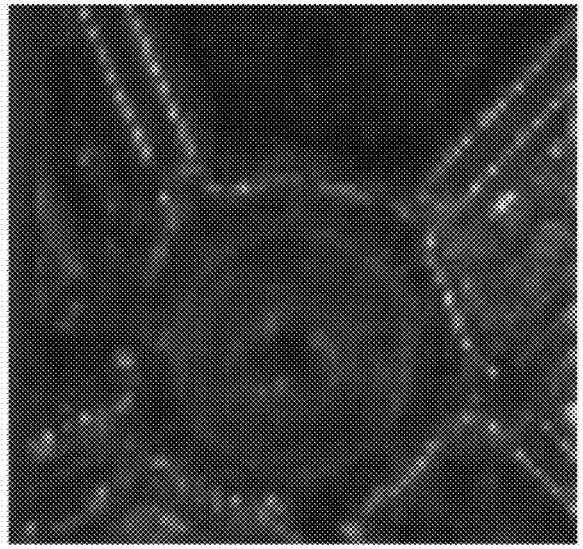
Figure 5C:
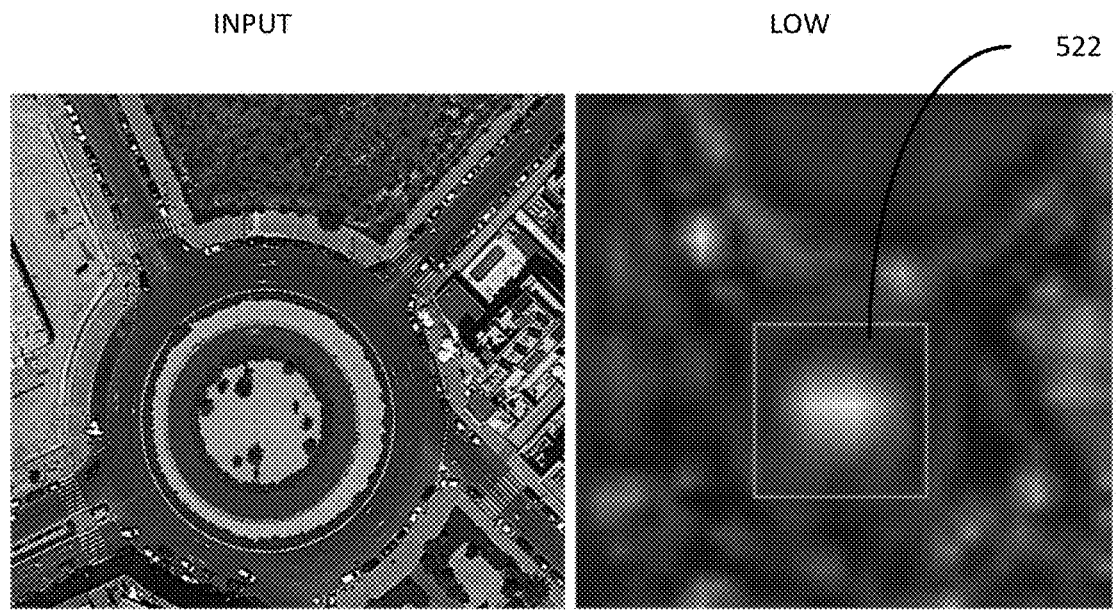
Figure 5D:
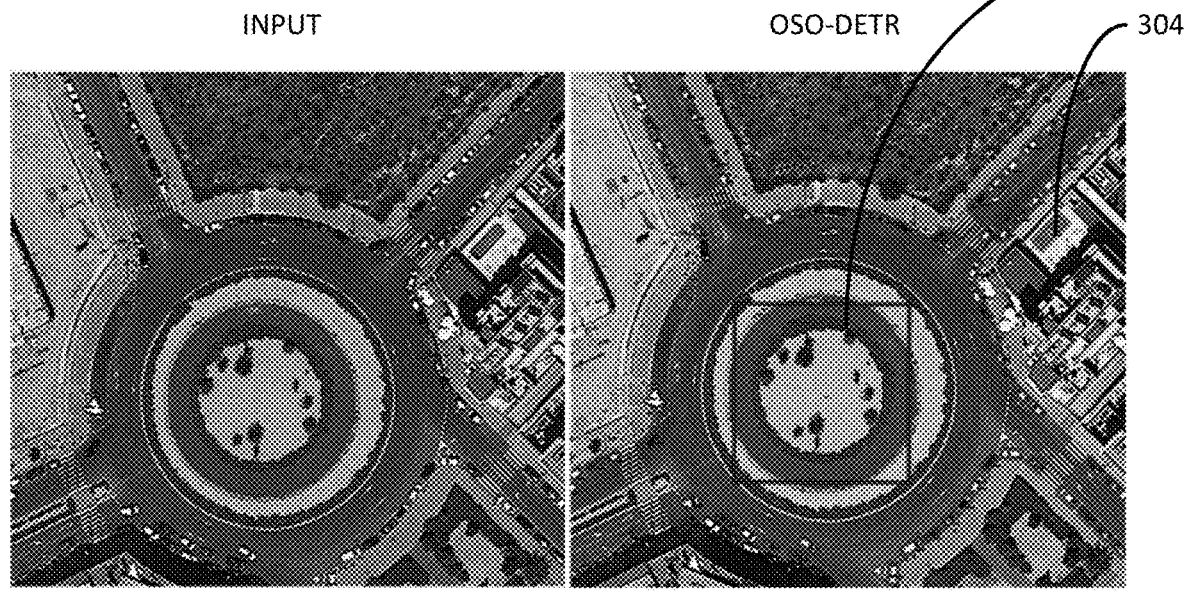
Figure 5E:
Figure 5E:
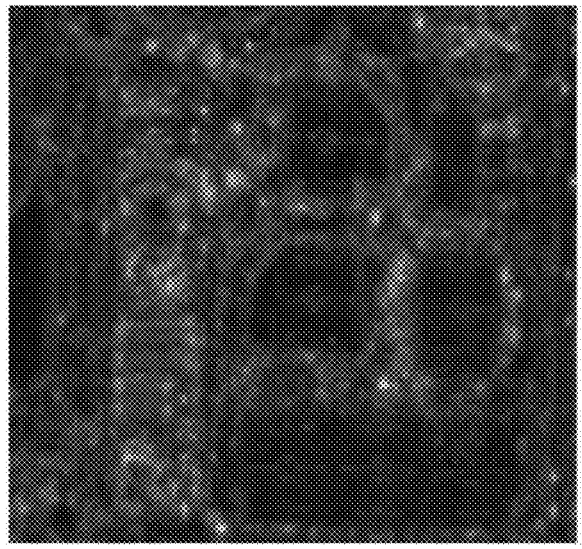
Figure 5F:
Figure 5F:
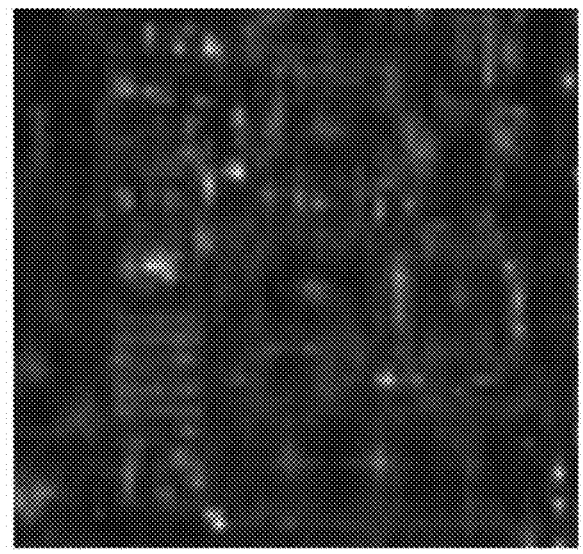
Figure 5G:
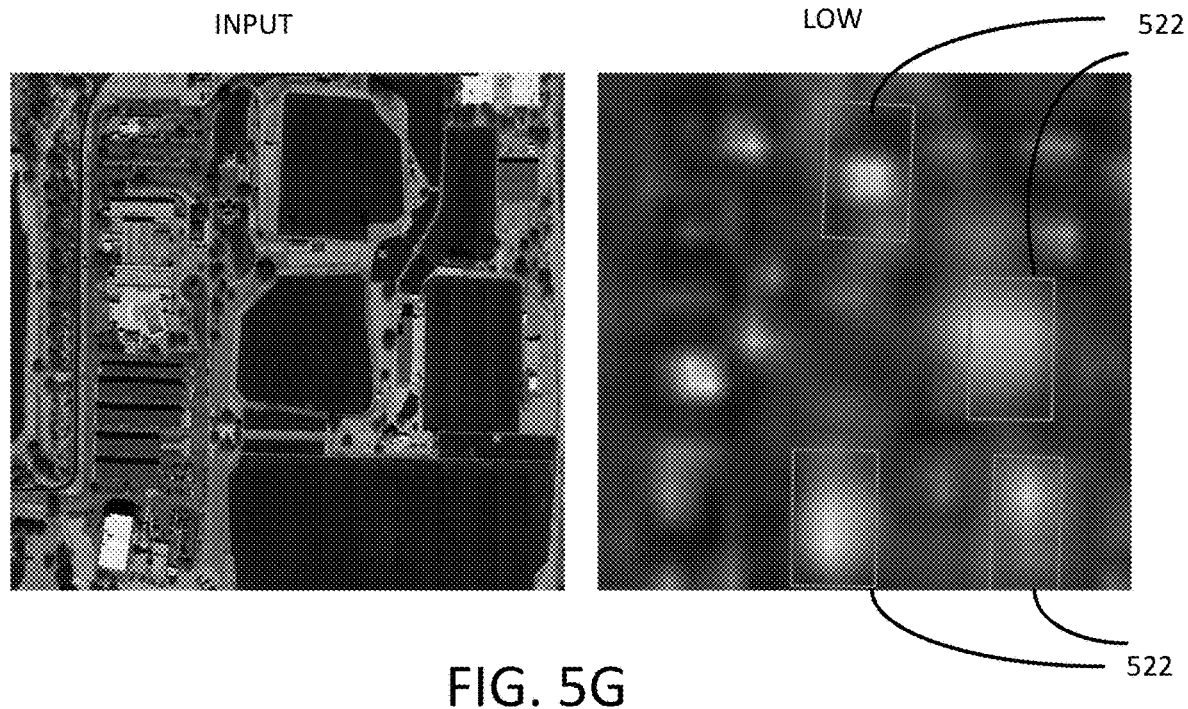
Figure 5H:
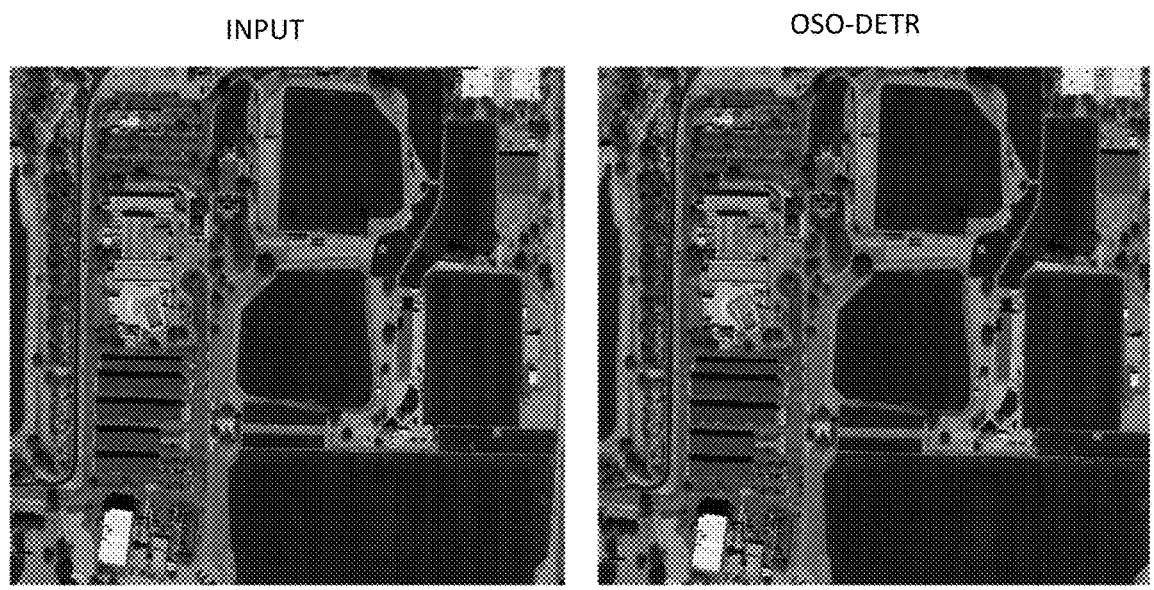
Figure 5I:
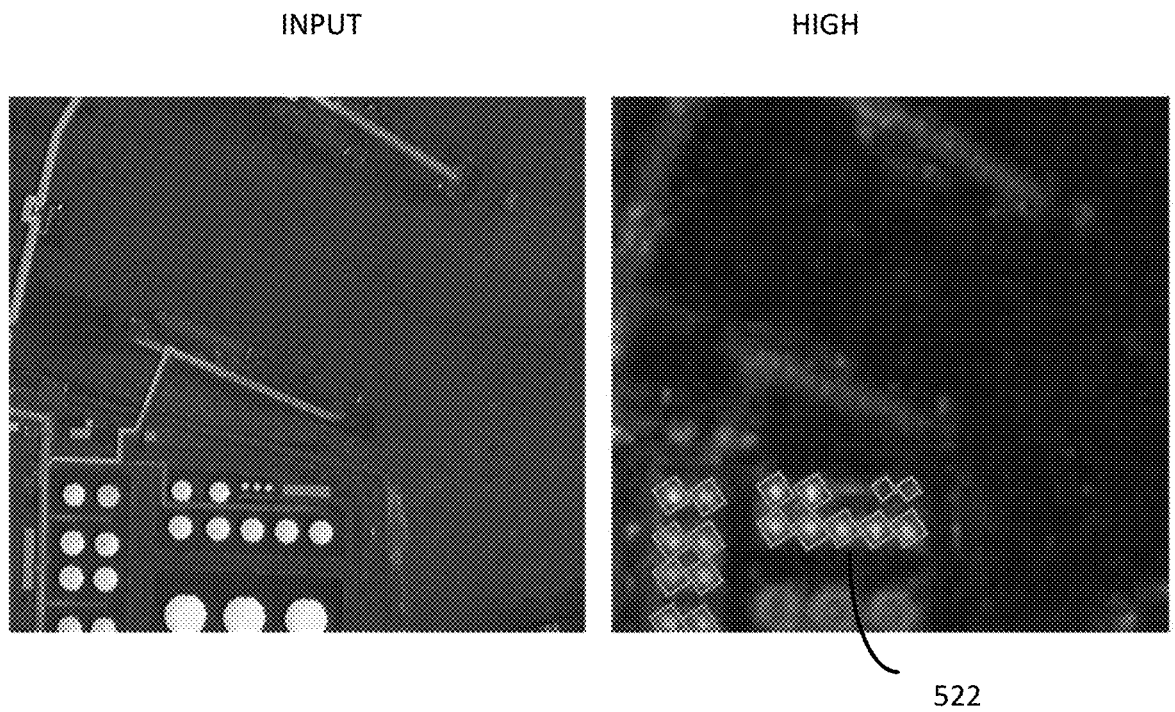
Figure 5J:
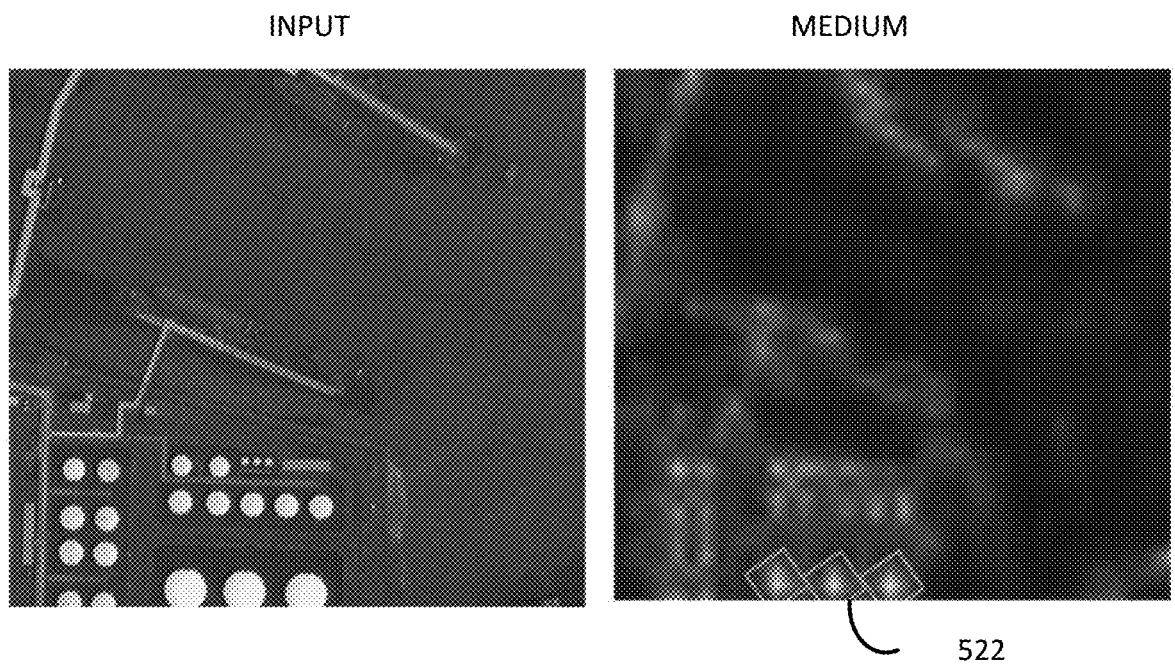
Figure 5K:
Figure 5K:
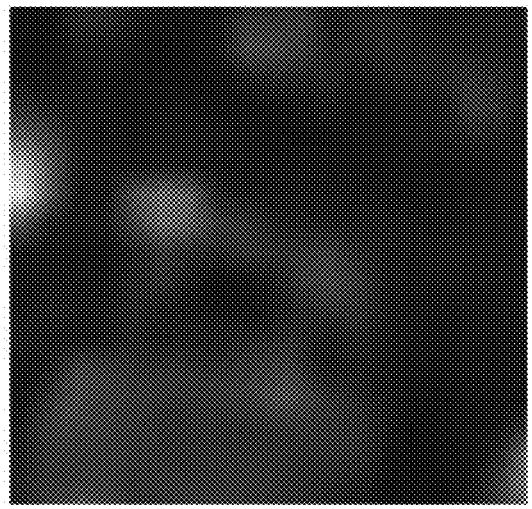
Figure 5L:
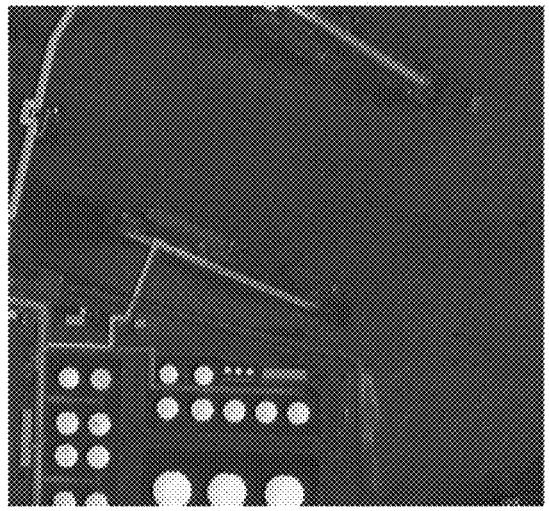
Figure 5L:
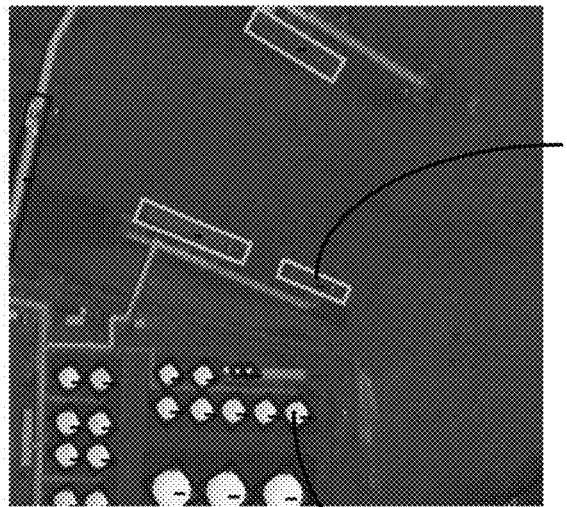

FIG. 4 is a block diagram of an architecture for an open-world semi-supervised oriented satellite object detection transformer, (OSO-DETR). The architecture for OSO-DETR 400 includes a backbone network 426, deformable encoder 428, deformable decoder 432, rotation-aware pyramidal pseudo-labeling 460, oriented box prediction head 442, novelty classification 456 and objectness branches 444.

The backbone network 426 takes an input image 404 of spatial resolution H×W and extracts multiscale features for the deformable encoder-decoder network 428, 432 having M learnable object queries 434 at the decoder 432. The decoder 432 employs interleaved cross- and self-attention and outputs M object query embeddings 436 ($z$). These query embeddings 436 are used in oriented box prediction head 442, and objectness 444 and novelty classification 446 branches. In addition, these embeddings 436 ($z$) are used in the semi-supervised learning framework to align the current network ($\mathcal{M}_{cur}$) with the detached network ($\bar{\mathcal{M}}_{prev}$). Augmented images 406 are taken as input to the current network 410 and corresponding embeddings ($z^a$) are transformed to the latent space of the detached network using a mapping network 418 ($\mathcal{G}$). These transformed embeddings are aligned with the embeddings 416 ($\bar{z}$) obtained for the same images from the detached network using a self-supervised learning loss named Barlow Twins loss 422 ($\mathcal{L}_{BT}$). See Jure Zbontar, Li Jing, Ishan Misra, Yann LeCun, and Stéphane Deny. Barlow twins: Self-supervised learning via redundancy reduction. In *International Conference on Machine Learning*, pages 12310-12320. PMLR, 2021, incorporated herein by reference in its entirety.

A fully supervised learning is employed for the first task (task-1) where the object detector is trained with initial known object categories. During task-1 inference, the model detects all known and unknown object categories. Then, in the subsequent task, the model is trained with new object categories in the semi-supervised incremental learning setting where annotations are only for a partial set of training data. Here, the objective is to learn new object categories using labeled and unlabeled data without forgetting the task-1 categories. To this end, a detached network is used whose weights are fixed during incremental learning, and an identical current network is used where the network weights are updated. A self-supervised learning setting is employed of current network (by taking detached network as reference) using labeled and unlabeled data, followed by fine-tuning of the current network using available labeled data. Next, a rotation aware pyramidal pseudo-labeling scheme is described.

Rotation-Aware Pyramidal Pseudo Labeling

As discussed, in OWOD-S there are no annotations for unknown objects, yet they need to be accurately detected. Here, the model transfers its known object detection knowledge to detect unknown objects. A baseline model utilizes a single-scale pseudo-labeling scheme better suitable for standard object detection in natural images. Considering challenges such as large scale variations, high object density, heavy background clutter, and large number of object instances in satellite images, the present object detection transformer includes a rotation-aware pyramidal pseudo-labeling scheme 460.

In embodiments, $\mathcal{F} = \{C2, C3, C4, C5\}$ 426 are multi-scale backbone features and $\psi_k = [o_k^x, o_k^y, h_k, w_k, \alpha_k]$ is an oriented box proposal predicted for a given object query embedding 436. Then, the average feature activation within the box is likely to indicate the presence of an object within the box. The average activation score is used to measure 'objectness' 454, i.e., the possibility of having an object within the box y.

In task-1, large objects, such as soccer field, and small objects, such as storage tank, are example unknown objects. To address the large scale variations within unknown objects, the present object detection transformer includes a rotation-aware pyramidal pseudo-labeling (RaPPL) scheme 460. Based on the known category annotations, a distribution of box areas is obtained within the dataset and then the object proposals are divided into small, medium, and large based on box area. Then, instead of using only single-scale C4 features from ResNet50, C3, C4 and C5 backbone features 464 are extracted for the objectness prediction. At each backbone feature scale $Ci \in \mathbb{R}^{H_i \times W_i \times D_i}$, a 2D spatial objectness map $A_i \in \mathbb{R}^{H_i \times W_i}$ 464 is obtained by averaging across channels 462

$$\left(\text{i.e., } A_i = \frac{1}{D_i}\sum_k^{D_i} C_{i_k}\right).$$

FIGS. 5A-5L illustrate qualitative results showing the effectiveness of RaPPL strategy. FIGS. 5A-5L include: the input image, and its corresponding high, medium and low resolution averaged feature maps from backbone ($A_3$, $A_4$, $A_5$) illustrating known (304, 522) and unknown (302, 502) objects predicted by the OSO-DETR. To compute objectness score of a predicted unknown object, RaPPL performs scale-specific selection of backbone features based on predicted bounding box area. The unmatched boxes matching with the corresponding resolutions are illustrated over respective feature maps.

The larger resolution $A_3$ map is used to predict the objectness of small proposals. Similarly, $A_5$ is used for large-sized proposals and $A_4$ for medium-sized objects. For each oriented box proposal $\psi_k$ 466, the corresponding feature map $A_i$ is selected based on box area and its objectness score $s_k$ is computed as, $s_k = V_k \cdot A_i$. Here, $V_k \in \mathbb{R}^{H_i \times W_i}$ is a binary mask having '1' inside the oriented box regions of $\psi_k$ and '0' outside the box.

The regression branch 442 in the prediction head takes M object query embeddings 436 from the decoder 432 and predicts M oriented box proposals. The bipartite matching loss in the decoder selects K queries (from M total queries) as positive matches 452 for the known classes in the supervised setting. From the remaining M-K queries, the unmatched boxes 466 with the highest objectness score are selected 468 as pseudo-labels 472 and used to train the objectness 454 and novelty classification 456 branches.

Semi-Supervised Incremental Learning

In an embodiment, the supervision level is reduced for incremental learning of new categories in the open-world object detector. With this objective, a semi-supervised incremental learning strategy is provided within the open-world object detection formulation, named as open-world semi-supervised object detection. Standard semi-supervised object detection aims to train an object detector with a set of labeled images $D_s = \{I_i^s, Y_i^s\}^{N_s}$ and unlabeled images $D_u = \{I_i^u\}^{N_u}$ where $D_s \cap D_u = \emptyset$ and preferably $N_s \ll N_u$. A popular approach of such frameworks is to generate pseudo-labels for the unlabeled data and then train the model with a combination of labeled data and the unlabeled data with pseudo labels. See Yen-Cheng Liu, Chih-Yao Ma, Zijian He, Chia-Wen Kuo, Kan Chen, Peizhao Zhang, BichenWu, Zsolt Kira, and Peter Vajda. Unbiased teacher for semi-supervised object detection. *arXiv preprint arXiv:* 2102.09480, 2021; and Kihyuk Sohn, Zizhao Zhang, Chun-Liang Li, Han Zhang, Chen-Yu Lee, and Tomas Pfister. A simple semi-supervised learning framework for object detection. *arXiv preprint arXiv:* 2005.04757, 2020, each incorporated herein by reference in their entirety. Such pseudo-label based methods show promising results in standard semi-supervised object detection having a closed set of objects, which restricts the unlabeled objects to be from the same classes as the labeled data. However, in the open-world semi-supervised object detection formulation, semi-supervised learning is employed for incremental learning of novel categories. So, in satellite image object detection, the model has to learn to detect novel object categories by using a limited amount of annotated data, without forgetting previously learned categories.

A subset of object categories is introduced to the model through subsequent tasks. For the first task, the model is trained like a standard object detector and a set of classes $\mathcal{K}^1 = \{C_1, C_2, \ldots C_n\}$ are introduced. However, for subsequent tasks, semi-supervised learning is used, since only limited annotations are available. For the subsequent task, the model is first trained incrementally for new category concepts using partial data ($N_s$) with annotations. This model $\mathcal{M}_{cur}$ is then trained on both labeled and unlabeled data using a self-supervised learning loss by utilizing a distillation through time strategy. Finally, the model is fine-tuned on the labeled subset.

For semi-supervised learning using the incremental data $D^{t+1}$, strong augmentations are employed such as color-jitter, random greyscaling and blurring to obtain augmented data $D_a^{t+1} = \{I^a,\}$ 406. The augmentations 406 are selected such that they do not change the oriented box positions in input images, hence better suitable for semi-supervised object detection. Furthermore, some augmentations are not used such as rotation, flipping, translation, cropping, etc. that are likely to alter the feature representation in augmented images.

In the distillation through time strategy, a detached model $\overline{\mathcal{M}}_{pre}$ is used whose weights are fixed, a current model $\mathcal{M}_{cur}$ is used with learnable weights, and a mapping network 418 $\mathcal{G}$ is used that maps the current model features to the detached model features. Here, a copy of the current model with fixed weights is used as the detached model $\overline{\mathcal{M}}_{pre}$. This detached model does not receive any gradient and remains detached during training.

For an image $I_i$ from $D^{t+1}$, and its augmented version $I_i^a$ from $D_a^{t+1}$, query embedding features are extracted using the current and detached models. For example, the current model is used and a clean image query embedding feature $z = \overline{\mathcal{M}}_{cur}(I_i)$ 436 is obtained and an augmented image query embedding, $z^a = \overline{\mathcal{M}}_{cur}(I_i^a)$ is obtained. Similarly, the detached model is used to obtain the embedding $\bar{z}^a = \overline{\mathcal{M}}_{pre}(I_i^a)$ 416. Then, the mapping network 418 $\mathcal{G}$ strives to map $\bar{z}^a$ to $z^a$ using a distillation loss $\mathcal{L}_D$, instead of enforcing $\bar{z}^a$ to be similar to $z^a$ as that may adversely effect the incremental learning. Barlow Twins loss 422 ($\mathcal{L}_{BT}$) is used to perform distillation and bring the embeddings $\mathcal{G}(z^a)$ and $\bar{z}^a$ together. See Zbontar et al. i.e., $$\mathcal{L}_D(z^a, \bar{z}^a) = \mathcal{L}_{BT}(\mathcal{G}(z^a), \bar{z}^a) \quad (1)$$

Here, the Barlow Twins loss 422 measures the cross-correlation matrix between input embeddings and makes it closer to the identity matrix. The loss strives to reduce the redundancy between embeddings and make the representations robust to noise. In addition, the same loss is used to make the model invariant to augmentation, which in turn may help the representations $z$ be invariant to the state of the model. Then, the current model $\overline{\mathcal{M}}_{cur}$ is trained using the following loss:

$$\mathcal{L}_{cur} = \mathcal{L}_{BT}(z^a, z) + \mathcal{L}_D(z^a, \bar{z}^a) = \quad (2)$$
$$\mathcal{L}_{BT}(z^a, z) + \mathcal{L}_{BT}(\mathcal{G}(z^a), \bar{z}^a) = \mathcal{L}_{BT}(z^a, z) + \mathcal{L}_{BT}(\mathcal{G}(z^a), \bar{z}^a)$$

Training and Inference

Training: The overall loss formulation for the network can be written as:

$$\mathcal{L} = \mathcal{L}_c + \mathcal{L}_r + a\mathcal{L}_o + \mathcal{L}_{cur} \quad (3)$$

where $\mathcal{L}_n$, $\mathcal{L}_r$ and $a\mathcal{L}_o$ respectively denote classification 456, oriented bounding box regression 452, foreground objectness (class-agnostic) loss 454 terms while $\mathcal{L}_{cur}$ stands for the loss from semi-supervised incremental learning from eq. 2.

The present framework follows multi-stage training. The first task is trained in a fully supervised manner using $\mathcal{L}_c$, $\mathcal{L}_r$, $\mathcal{L}_o$ (456, 452, 454). Then, the subsequent tasks follow the distillation through time strategy using an additional $\mathcal{L}_{cur}$ loss. A detached model and a current model are trained on augmented unannotated data together with a mapping network 418 $\mathcal{G}$ on top to bring the embeddings closer in latent space using Barlow Twins. See Zbontar et al.

Inference: The object queries for a test image I are obtained and the model predicts their labels from $\mathcal{K}^t + 1$ classes along with an oriented bounding box. A top-k selection 468 with the highest scores is used for OWOD detection.

Experiments

The OSO-DETR has been evaluated on the DOTA dataset for object detection. DOTA is one of the largest datasets for oriented object detection. It contains large aerial images ranging in size from around 800×800 to 4000×4000 with annotations for 15 common categories. In some embodiments, the DOTA dataset is split as an OWOD-S split. The training and test set are both built from a combination of train and validation sets of the DOTA dataset since the annotations for test set are unavailable. The training and test sets are created on a basis of the number of instances of each object category and not on the number of images, and this keeps a fair distribution split for all classes. Similarly, these sets have been made ensuring that corresponding percentages of all categories are present.

Figure 6:
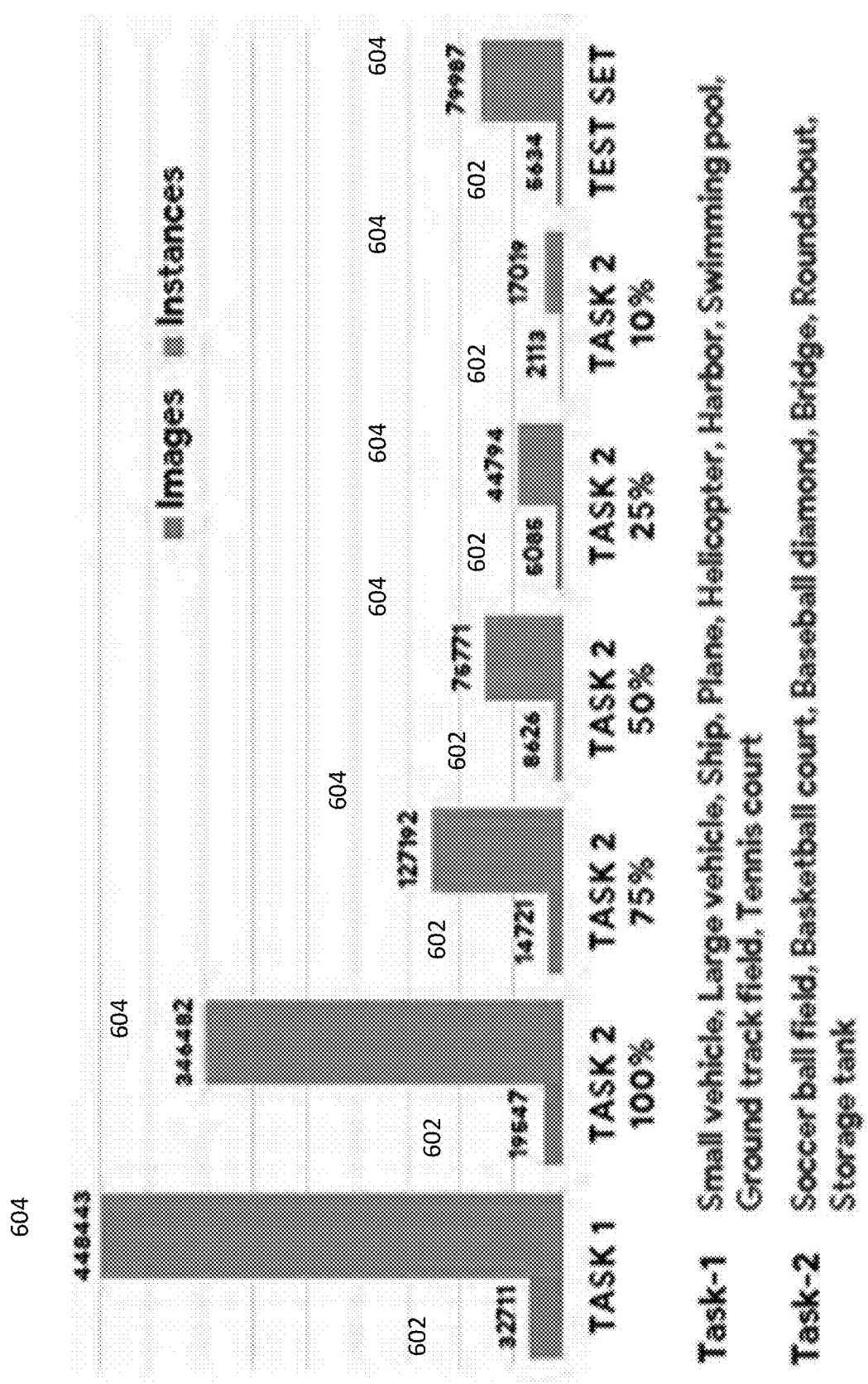
FIG. 6 is a chart of a comparison of images and object instances in each partial annotation setting for training.

FIG. 6 is a chart of a comparison of images and object instances in each partial annotation setting for training. The OSO-DETR is evaluated on OWOD-S split dataset for OWOD problem in satellite images. FIG. 6 shows, for each task in the corresponding split, the number of images 602 and instances 604 (objects). The dataset is split into two tasks for OWOD. A Task-1 split is used in a fully-supervised setting. In a Task-2 split, several proportions of annotation are kept based on the number of instances. These sets have been made ensuring that corresponding percentages of all categories are present. In addition, further experiments with OWOD splits are performed on MS COCO introduced in previous works to extend the contributions to natural images.

Evaluation Metrics: The standard mean average precision (mAP) is a metric for known classes. However, mAP cannot be utilized as a fair metric to evaluate unknown detection since all possible unknowns are not labeled and can be more than given classes to be encountered in the next set of tasks. Therefore, average recall is used as a metric to test unknown object detection, as in Bansal et al. and Lu et al. under a similar context. See Ankan Bansal, Karan Sikka, Gaurav Sharma, Rama Chellappa, and Ajay Divakaran. Zero-shot object detection. In *Proceedings of the European Conference on Computer Vision (ECCV)*, pages 384-400, 2018; and Cewu Lu, Ranjay Krishna, Michael Bernstein, and Li Fei-Fei. Visual relationship detection with language priors. In *European conference on computer vision*, pages 852-869. Springer, 2016, each incorporated herein by reference in their entirety.

Implementation Details: The object detection transformer architecture can be implemented as a version of Deformable DETR (D-DETR) adapted with an additional prediction head to provide the angle of oriented bounding box. Multi-scale feature maps can be taken from ImageNet pre-trainedResNet-50 backbone. See Kaiming He, Xiangyu Zhang, Shaoqing Ren, and Jian Sun. Deep residual learning for image recognition. In *Proceedings of the IEEE conference on computer vision and pattern recognition*, pages 770-778, 2016, incorporated herein by reference in its entirety. The number of queries can be set to M=250 to account for the high number of instances in satellite images, while the threshold for the selection of pseudo-labels is set to top-10. Training can be carried out for 50 epochs using ADAM optimizer with weight decay (AdamW) and learning rate set to $10^{-4}$. See Diederik P Kingma and Jimmy Ba. Adam: A method for stochastic optimization. *arXiv preprint arXiv:1412.6980*, 2014, incorporated herein by reference in its entirety.

Figure 7:
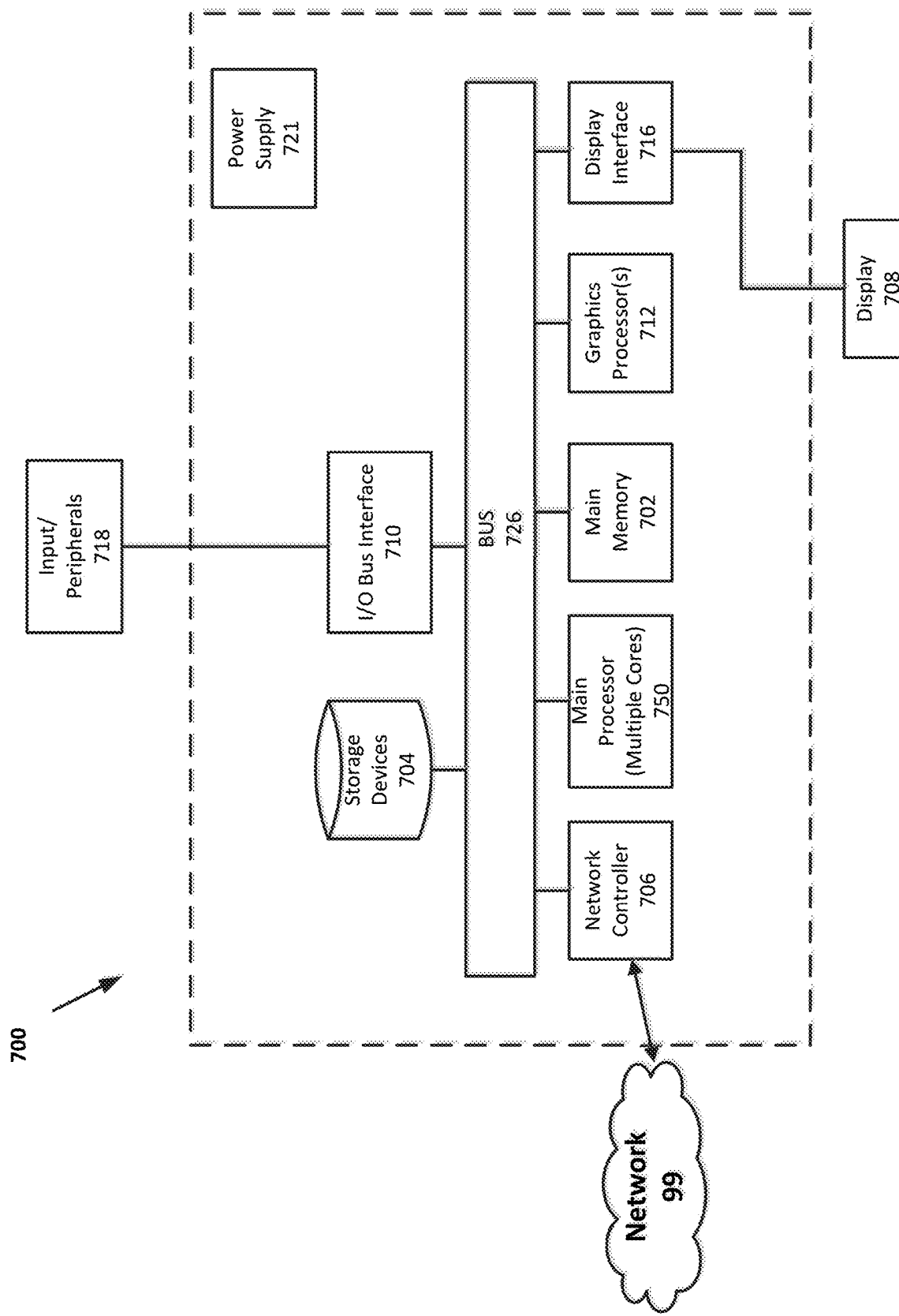
FIG. 7 is a block diagram of a computer system that can be used to implement the object detection transformer.

FIG. 7 is a block diagram illustrating an example computer system for implementing the training and inference methods for the object detection transformer according to an exemplary aspect of the disclosure. In one embodiment, the computer system 700 is included in an Earth ground station 108, or is connected to the Earth base station. The computer system may be an AI workstation running an operating system, for example Ubuntu Linux OS, Windows, a version of Unix OS, or Mac OS. The computer system 700 may include one or more central processing units (CPU) 750 having multiple cores. The computer system 700 may include a graphics board 712 having multiple GPUs, each GPU having GPU memory. The graphics board 712 may perform many of the mathematical operations of the disclosed machine learning methods. The computer system 700 includes main memory 702, typically random access memory RAM, which contains the software being executed by the processing cores 750 and GPUs 712, as well as a non-volatile storage device 704 for storing data and the software programs. Several interfaces for interacting with the computer system 700 may be provided, including an I/O Bus Interface 710, Input/Peripherals 718 such as a keyboard, touch pad, mouse, Display Adapter 716 and one or more Displays 708, and a Network Controller 706 to enable wired or wireless communication through a network 99. The interfaces, memory and processors may communicate over the system bus 726. The computer system 700 includes a power supply 721, which may be a redundant power supply.

In some embodiments, the computer system 700 may be an AI workstation, such as the NVIDIA A100 workstation, and can include a CPU and a graphics card by NVIDIA, in which the GPUs have multiple CUDA cores. In some embodiments, the computer system 700 may be a machine learning engine 712, such as the engine in the Apple M3, M4 system on chip.

Experiments on Satellite Images

In order to demonstrate effectiveness of the OSO-DETR, experiments have been performed on satellite images. The RaPPL scheme feeds into the novelty classification and objectness branches which helps build a better separation of unknown objects from knowns and background in the satellite images.

Table 1 reports unknown recall (U-recall) for task 1 supervised training which assesses the model's capability to capture unknown objects for the OWOD-S setting. The comparison is shown in terms of mAP and unknown recall (U-Recall). The unknown recall metric assesses the model's ability to capture unknown object instances. While using full task-2 data, the OSO-DETR improves 5.1% in unknown recall over the Baseline without compromising overall mAP. The Baseline achieves an unknown recall of 2.5 on Task-1, with an mAP of 64.9 on the OWOD-S task-1 benchmark. On the same task, OSO-DETR achieves an unknown recall of 7.6 and 65.5 mAP.

TABLE 1

Comparison between the baseline and the OSO-DETR on the OWOD-S splits.

| Model | Evaluation | Overall mAP | U-Recall |
|---|---|---|---|
| Baseline | Task-1 | 64.9 | 2.5 |
|  | Task-2 | 68.1 | — |
| OSO-DETR | Task-1 | 65.5 | 7.6 |
|  | Task-2 | 68.4 | — |

Table 2 shows a comprehensive comparison of the semi-supervised incremental learning strategy at different proportions of partially annotated data with a steady improvement over baseline under similar settings. This comparison demonstrates the semi-supervised incremental learning strategy at different proportions of partially annotated data with a steady improvement over baseline under similar settings. The semi-supervised learning pipeline takes advantage of the unannotated data while maintaining the performance on previously known classes. In particular, this consistent improvement shown under the limited annotation availability setting emphasizes the effectiveness of the OSO-DETR in a close to realistic OWOD-S scenario without forgetting previously known classes. Absolute gains of 17.2% and 16.4% respectively are achieved while training with 10% and 25% annotated data.

TABLE 2

Reports a comparison of results with and without semi-supervised learning on proposed OWOD-S splits.

| Partial Annotation | SSL | mAP | | |
|---|---|---|---|---|
| | | Overall | Previously Known | Current Known |
| 100% | ✗ | 68.4 | 74.2 | 59.8 |
| 75% | ✗ | 65.2 | 74.8 | 50.9 |
| | ✓ | 67.8 | 74.6 | 57.5 |
| 50% | ✗ | 63 | 74.5 | 45.8 |
| | ✓ | 66.4 | 73.0 | 56.6 |
| 25% | ✗ | 54.8 | 74.5 | 25.6 |
| | ✓ | 58.4 | 72.1 | 42.0 |
| 10% | ✗ | 50.8 | 74.5 | 15.2 |
| | ✓ | 56.5 | 72.4 | 32.6 |

Experiments on Natural Images

Features of the present OSO-DETR are also useful in natural image domain. Table 3 shows comparison with previous works in OWOD for splits on MS COCO. See Gupta et al. and Joseph et al. The comparison is presented in terms of unknown recall (U-Recall) and the known class mAP for the task-1. For task-2 involving incremental learning, the mAP scores are reported for 'Previously Known' and 'Current Known' classes along with the 'Overall mAP'. The OSO-DETR approach outperforms the recent OW-DETR on both tasks on the unknown recall. Additionally, the semi-supervised incremental learning strategy helps OSO-DETR with 50% annotated data to achieve results comparable to OW-DETR. In particular, compared to the state-of-the-art method OW-DETR, the OSO-DETR achieves an absolute gain of 3%, and 2.1% in unknown recall for task-1 and task-2, respectively. Furthermore, the OSO-DETR performs on par with state-of-the-art OW-DETR in terms of mAP for previously known and current known classes. The semi-supervised incremental learning with just 50% annotations gives results comparable with the state-of-the-art OW-DETR using fully (100%) annotated data. This poses OSO-DETR as closer to a realistic solution by overcoming the requirement of fully supervised incremental learning for OWOD problem.

TABLE 3

Reports state-of-the-art comparison for the open-world object detection (OWOD) problem on natural images using MS COCO split of Gupta et al. Best results are in bold.

| | Task-1 | | Task-2 | | | |
|---|---|---|---|---|---|---|
| | mAP | | | mAP | | |
| Task IDs | U-Recall | Current Known | U-Recall | Previously Known | Current Known | Overall |
| ORE-EBUI | 1.5 | 61.4 | 3.9 | 56.5 | 26.1 | 40.6 |
| OW-DETR | 5.7 | 71.5 | 6.2 | 62.8 | 27.5 | 43.8 |
| OSO-DETR (100% data) | 8.7 | 71.6 | 8.3 | 61.8 | 28 | 44.1 |
| OSO-DETR (50% data) | — | — | 8.7 | 61.2 | 25.5 | 42.5 |
| OSO-DETR (25% data) | — | — | 7.9 | 57.1 | 22.8 | 39.1 |

See Joseph et al. and Gupta et al.

OWOD-S Splits

Open-world object detection is a challenging paradigm because of the open structure of the problem; unknown object classes. OSOD-S splits are presently provided to facilitate research in this challenging problem setting. The OWOD-S data splits avoid data leakage across tasks and ensure a fair usage of the entire data at the same time. Similar object categories like small and large vehicles are put together in the same task to avoid data leakage.

Along with splitting the object classes into tasks to be learned in an incremental way, partially labeled data are used for the tasks based on the number of instances. Each partially labeled task denoted by a percentage amount is prepared such that it contains the mentioned proportion of annotated instances from each of the currently known object classes. Doing this split based on object instances instead of the number of images produces a fairer distribution among all object categories because randomly dividing by images may create an unfair concentration of certain classes that occur in high density. For example, storage tanks (up to 427 instances in an image) are seen to occur in much higher density as compared to roundabouts (up to 14 instances in an image).

Table 4 shows the proposed Split-1 and Split-2 for open world satellite object detection. For both splits, classes are introduced in each task.

In one embodiment, two splits named Split-1 and Split-2 are introduced dividing the object classes into two and four incremental learning tasks, respectively. In both splits, the object classes for each task are shown along with the total number of images and object instances. Each partially labelled task denoted by a percentage amount is prepared such that it contains the mentioned proportion of annotated instances from each of the currently known object classes. Test sets for each task are prepared such that all classes introduced till that task have class labels while others remain annotated as unknown. The object classes are abbreviated as SV—small-vehicle, LV—large vehicle, SH—ship, PL—plane, HC—helicopter, HA—harbor, SP—swimming pool, GTF—ground track field, TC—tennis court, SBF—soccer ball field, BC—basketball court, BD—baseball diamond, BR—bridge, RA—roundabout, ST—storage tank.

Split-1: The Split-1 comprises two tasks: task-1 with small- and large-vehicles, ships, planes, helicopters, harbors, swimming pools, ground track fields, tennis courts while task-2 consists of soccer ball fields, basketball courts, baseball diamonds, bridges, roundabouts and storage tanks.

Split-2: Split-2 divides the object classes into four tasks. This is done to imitate a realistic setting where a model is required to learn a few new categories when necessary or needed instead of a large pool of object classes to be learned incrementally. Here task-1 consists of small- and large-vehicles, ships, planes, helicopters, harbors, swimming pools, ground track fields, tennis courts; task-2 comprises basketball courts and baseball diamonds, task-3 with bridges and roundabouts, and the final task, task-4, has storage tanks and soccer ball fields.

TABLE 4

Task composition in the proposed OWOD-S splits for open-world evaluation in satellite images.

| Splits | Task | Classes | Images | Instances |
|---|---|---|---|---|
| Split 1 | Task 1 | SV, LV, SH, PL, HC, HA, SP, GTF, TC | 32711 | 448443 |
| | Task 2 100% | SBF, BC, BD, BR, RA, ST | 19547 | 346482 |
| | Task 2 75% | | 14721 | 127192 |
| | Task 2 50% | | 8626 | 75771 |
| | Task 2 25% | | 5085 | 44794 |
| | Task 2 10% | | 2113 | 17019 |

TABLE 4-continued

Task composition in the proposed OWOD-S splits
for open-world evaluation in satellite images.

| Splits | Task | Classes | Images | Instances |
|---|---|---|---|---|
| Split 2 | Task 1 | SV, LV, SH, | 448443 | 10550 |
| | Task 2 100% | PL, HC, HA, | 2363 | 5403 |
| | Task 2 50% | | 32711 | 1226 | 42789 |
| | Task 3 100% | SP, GTF, TC | 10550 | 22587 |
| | Task 3 50% | BC, BD | 5238 | 110855 |
| | Task 4 100% | BR, RA | 6634 | 56667 |
| | Task 4 50% | ST, SBF | 3283 | |
| | Test set | | 5634 | 79987 |

Results on the Proposed OWOD-S Splits

The performance of the OSO-DETR is evaluated on both Split-1 and Split-2 proposed for satellite images. In one embodiment, the test set for both splits is prepared from a common pool of images shared across all tasks. The test image annotations for each task are prepared such that all known (previously and currently introduced) classes have their corresponding class labels while others remain annotated as unknown. The object classes to be introduced in future tasks are used to evaluate unknown detections based on Unknown Recall (URecall) metric and known classes are evaluated using mAP.

Table 1 and Table 5 here show that the OSO-DETR maintains similar performance on split-1 and split-2 irrespective of the number of incremental learning tasks. This also shows that OSO-DETR is robust to forgetting on previously known categories under both fully-supervised and semi-supervised incremental learning settings, even when there are more subsequent tasks.

Table 5. Reports a comparison between baseline and OSO-DETR on the OWOD-S Split-2. The comparison is shown in terms of mAP for known classes and unknown class recall (U-Recall). The unknown recall metric assesses the model's ability to capture unknown objects. OSO-DETR shows significant gains in both U-Recall and mAP over the baseline across all tasks. Furthermore, OSO-DETR trained under a semi-supervised incremental learning setup with just 50% partially annotated data achieves results comparable to the fully supervised model, showing the importance of the proposed contributions.

three averaged feature maps (small, medium and large respectively) and lastly the detections from the present model. The feature maps have been illustrated with indication of locations where the unknowns are detected from. The first example in FIGS. 8A-8D show roundabout 802 being detected (804) from the medium scale. Next examples show, in FIGS. 8E-8H, bridges 812 and, in FIGS. 8I-8L, baseball diamond 822, being captured (822, 824) from large scale feature maps. However, some of the unknowns detected are learned from previously known classes and may not pertain to expected unknown labels. In the last example, in FIGS. 8M-8P, although empty parking lot is not a valid object category of the dataset, the model 'wrongly' predicts it as an unknown object 832, 834. It is believed that this is likely due to the visual similarity of an empty parking lot with the harbor category.

Figure 9A:
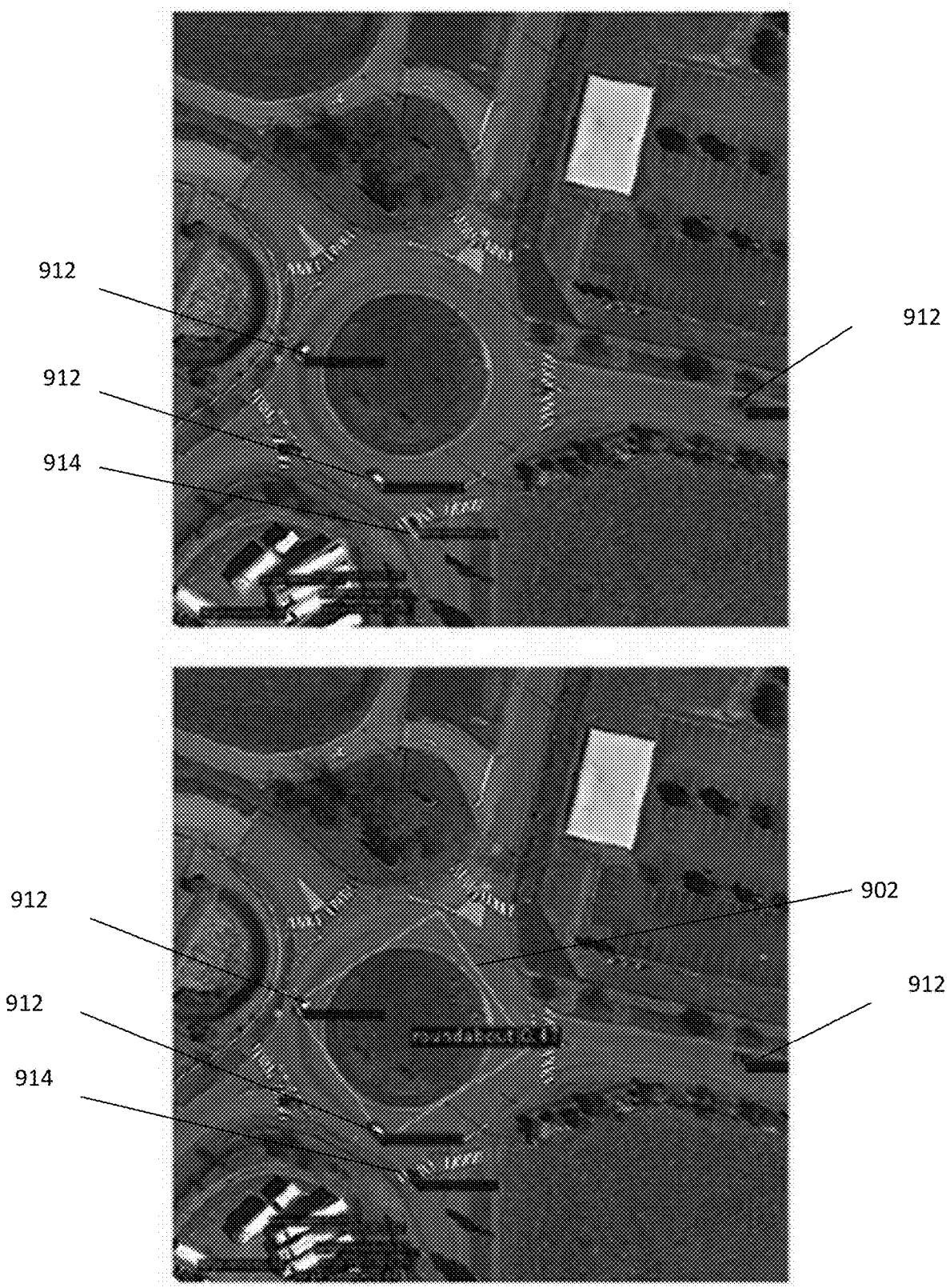
FIGS. 9A-9D illustrate qualitative results without and with semi-supervised incremental learning.
Figure 9B:
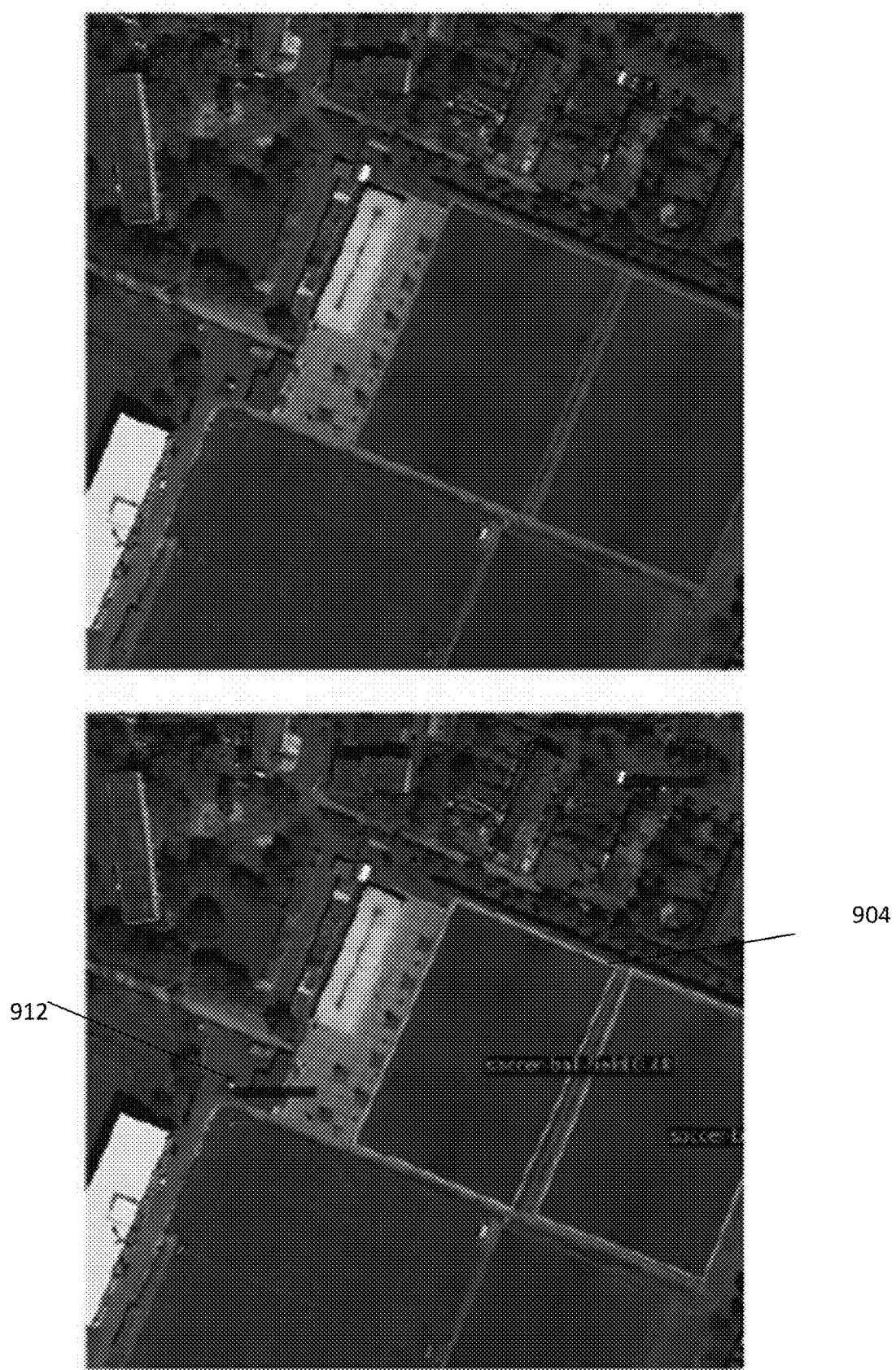
Figure 9C:
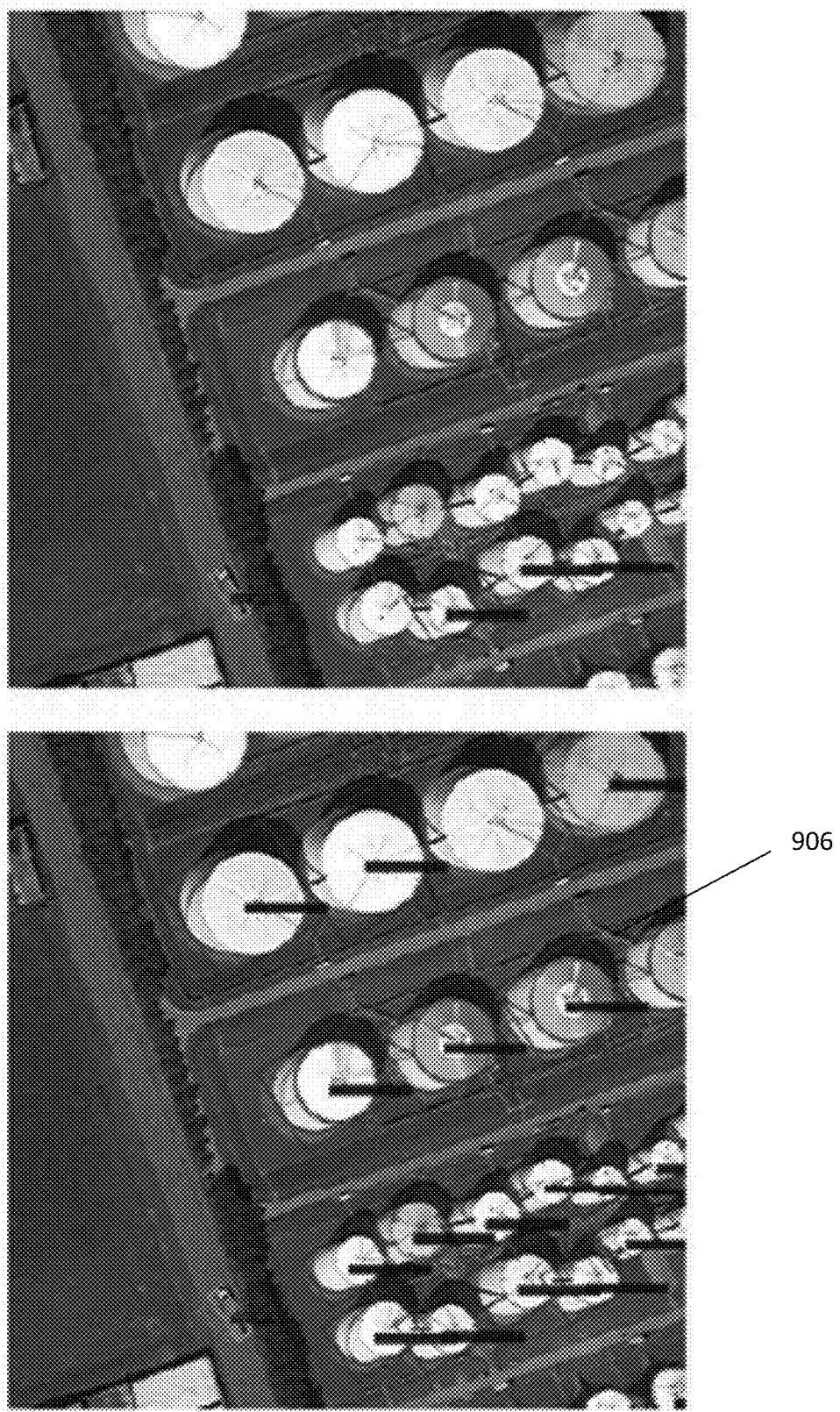
Figure 9D:
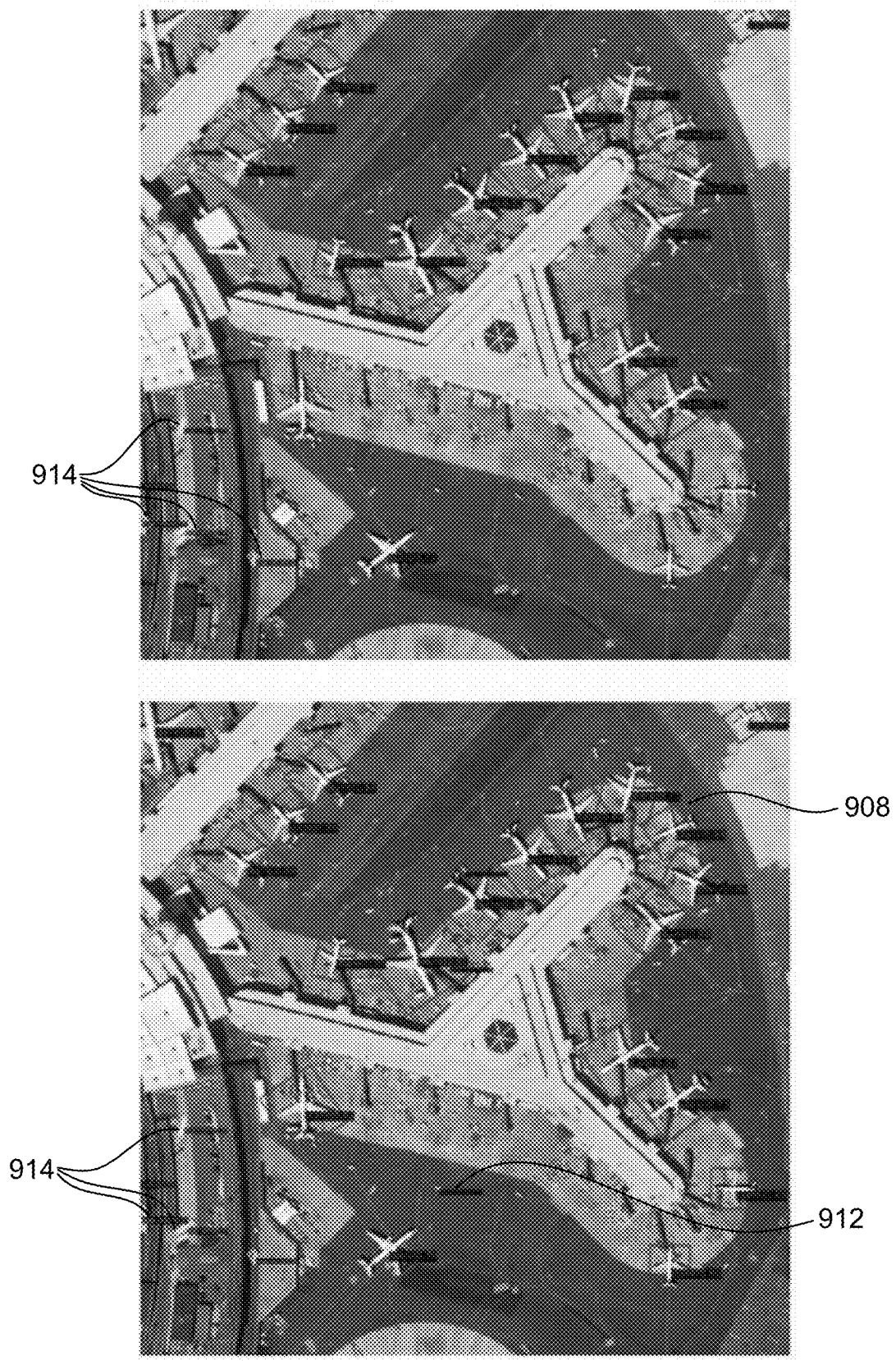

FIGS. 9A-9D show a comparison of results from Baseline model and OSO-DETR when both are trained with 25% labeled data where OSO-DETR is trained with semi-supervised incremental learning setup. For each example, Baseline results are shown on the top, while predictions of OSO-DETR are shown on the bottom. The general observation shows that the RaPPL scheme helps to detect better unknowns, in comparison to Baseline. In the first two examples, FIGS. 9A, 9B, OSO-DETR detects fewer false unknowns and correctly detects roundabout 902 and soccer ball fields 904, without forgetting the previously introduced classes such as small vehicle 912 and large vehicle 914. The third example, in FIG. 9C, shows OSO-DETR being able to detect a greater number of storage tanks 906 compared to the Baseline and previously introduced (plane) categories 908. The last example of the hanger, FIG. 9D, depicts OSO-DETR detecting additional number of planes 908 which shows reduced forgetting from previous task as a result of the distillation through time strategy.

Comparison with OW-DETR on MS COCO

Table 6 shows state-of-the-art comparison for open-world object detection (OWOD) on MS COCO split by OWDETR. See Akshita Gupta, Sanath Narayan, KJ Joseph, Salman Khan, Fahad Shahbaz Khan, and Mubarak Shah. Ow-detr: Open-world detection transformer. In *CVPR*, 2022, incorporated herein by reference in its entirety. The comparison is shown in terms of known class mAP and unknown class

TABLE 5

Reports a comparison between baseline and OSO-DETR on proposed OWOD-S Split-2.

| | Task-1 | | Task-2 | | | | Task-3 | | | | Task-4 | | |
|---|---|---|---|---|---|---|---|---|---|---|---|---|---|
| | mAP | | | mAP | | | | mAP | | | | mAP | |
| Task IDs | U-Recall | Previously Known | U-Recall | Previously Known | Current Known | Both | U-Recall | Previously Known | Current Known | Both | Previously Known | Current Known | Both |
| Baseline | 2.5 | 64.9 | 2.8 | 73.6 | 44.9 | 63.4 | 2.9 | 64.9 | 29.7 | 56 | 62.4 | 52.2 | 61.9 |
| OSO-DETR | 7.6 | 65.5 | 6.6 | 73.9 | 50.9 | 63.9 | 8.9 | 65.7 | 40.2 | 57.4 | 62.8 | 57.1 | 62.1 |
| OSO-DETR (50% SSL) | — | — | 6.7 | 73.5 | 41.2 | 59.8 | 8.3 | 64.1 | 42.2 | 56.4 | 60.1 | 52.4 | 59.1 |

Figure 8A:
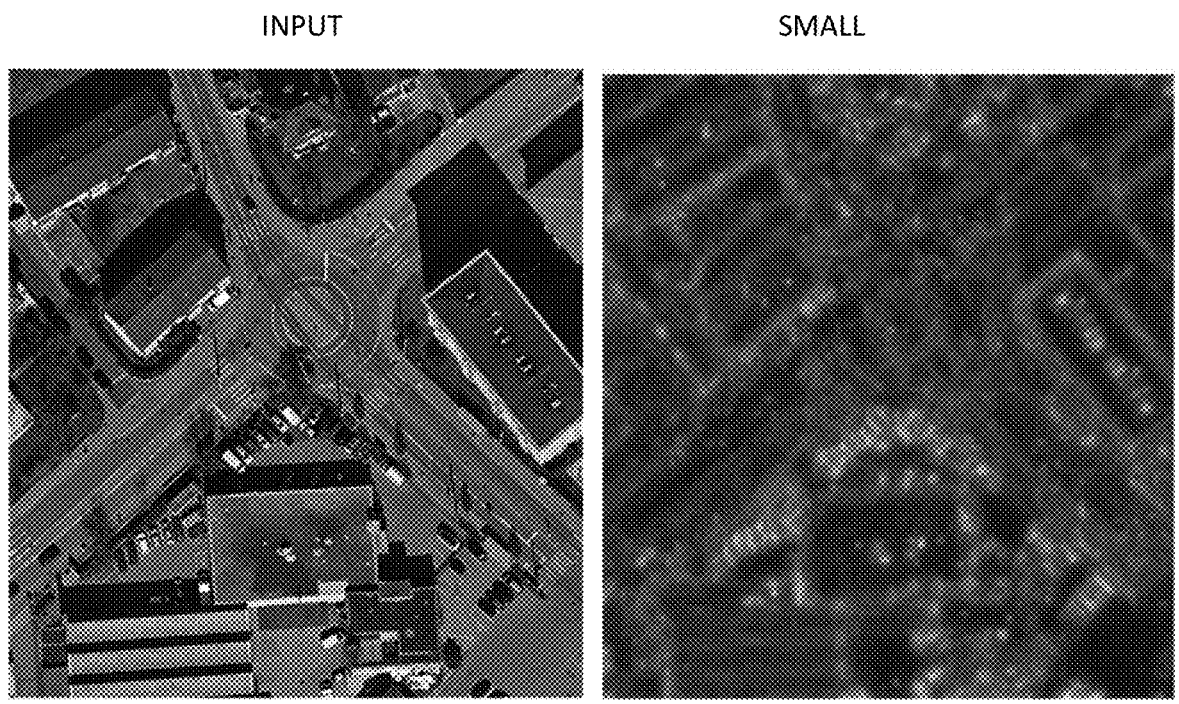
FIGS. 8A-8P illustrate further qualitative results for the transformer architecture of FIG. 4.
Figure 8B:
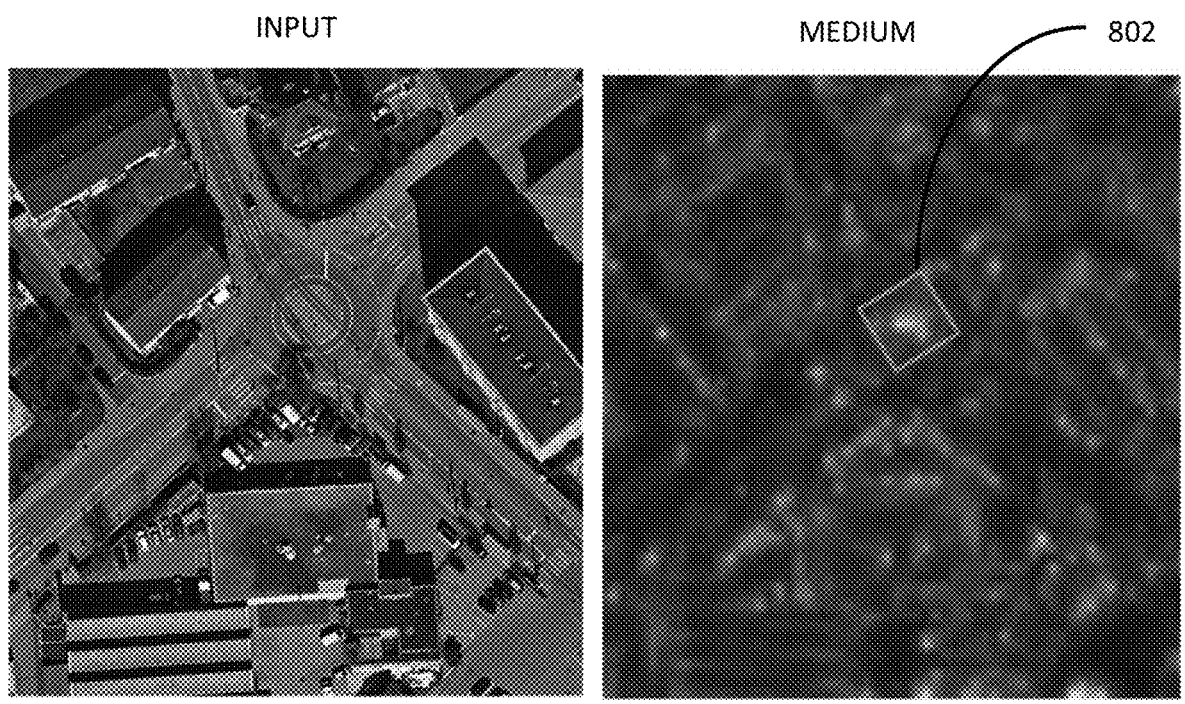
Figure 8C:
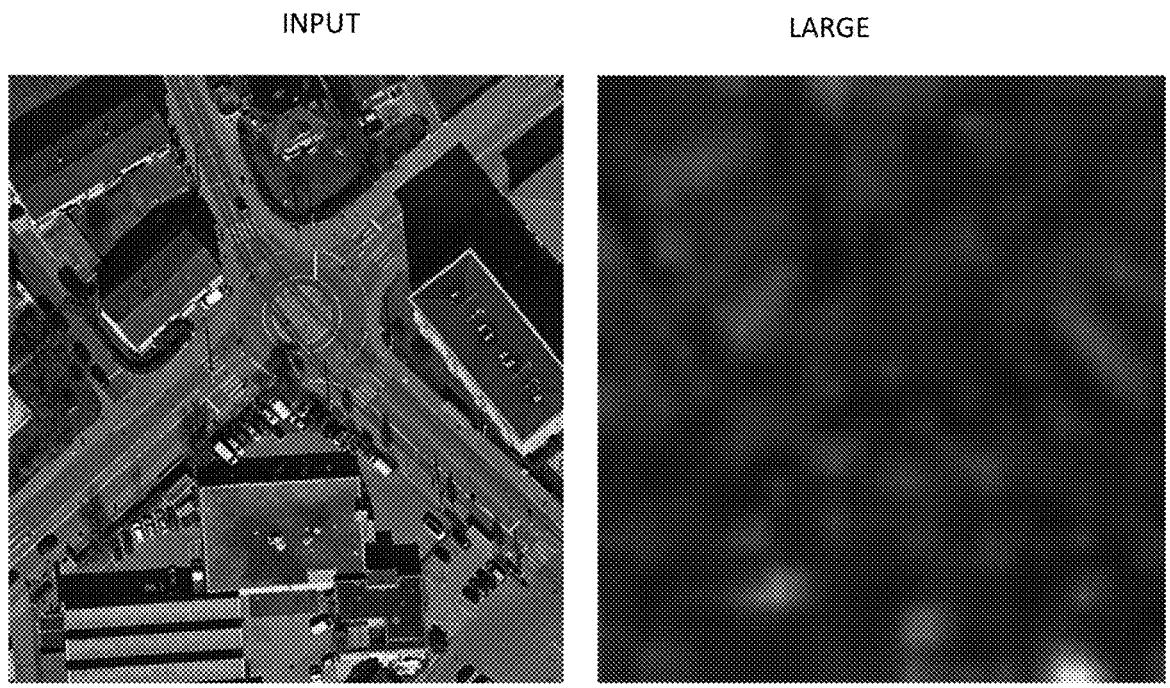
Figure 8D:
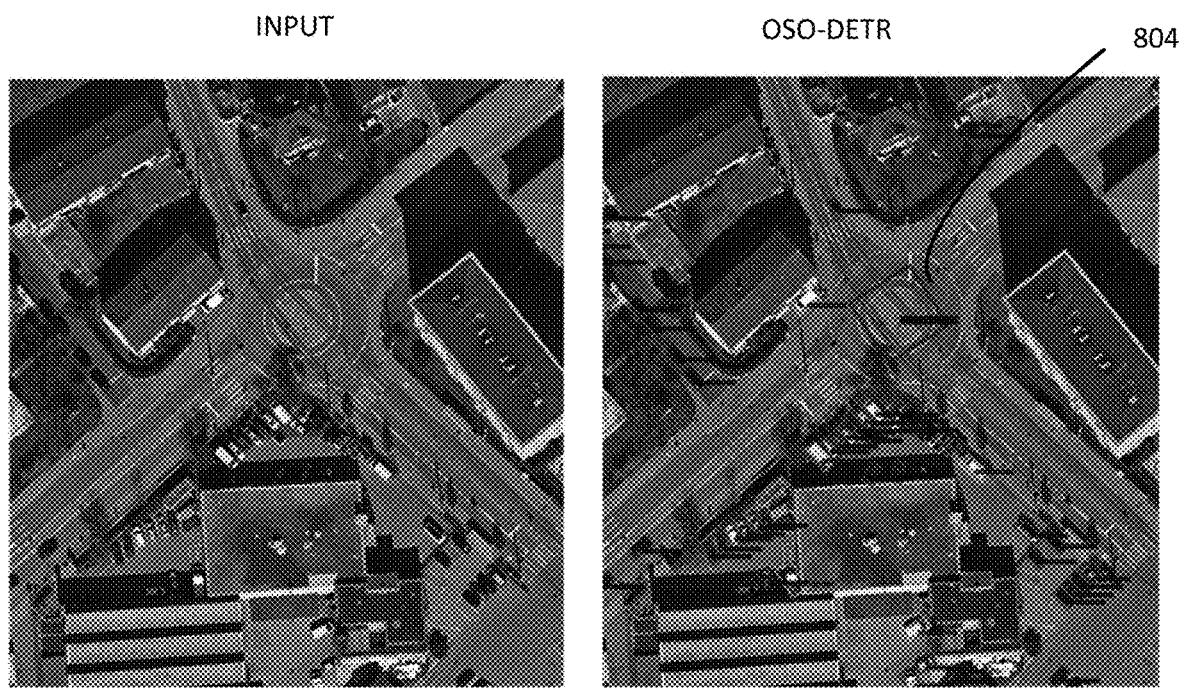
Figure 8E:
Figure 8E:
Figure 8F:
Figure 8F:
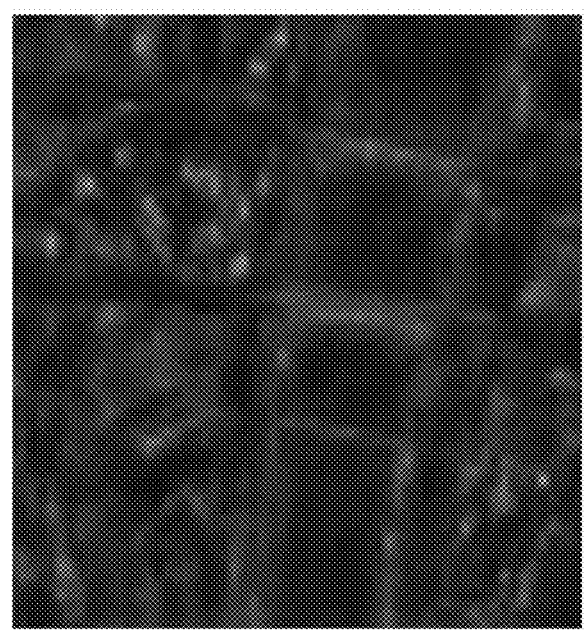
Figure 8G:
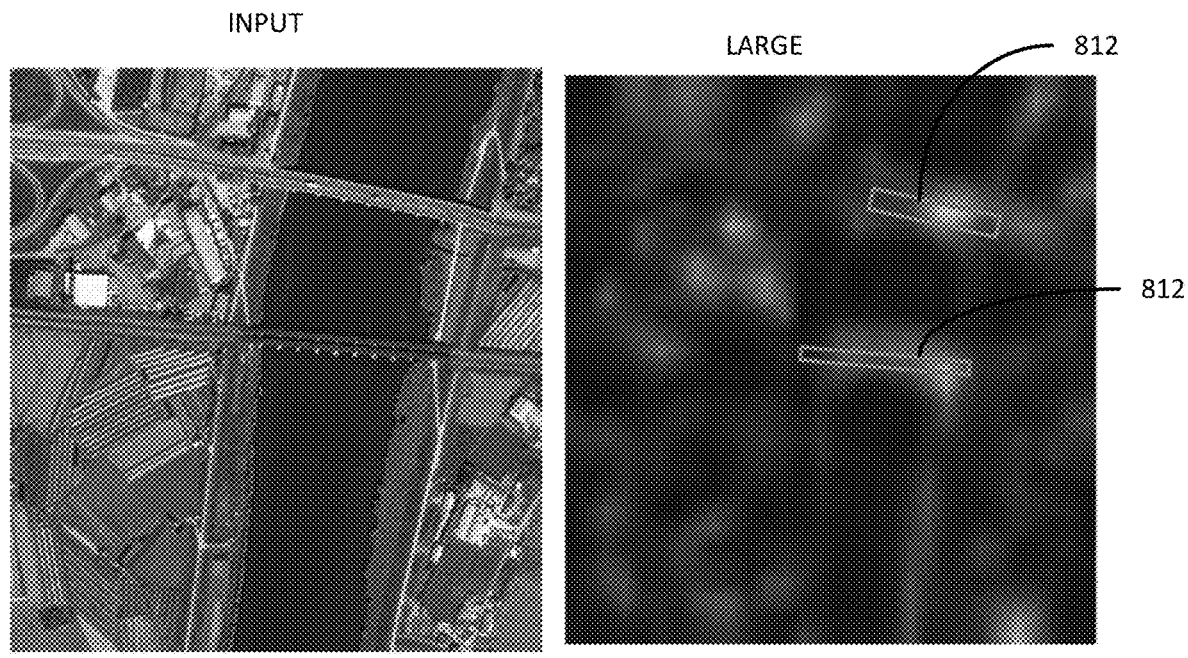
Figure 8H:
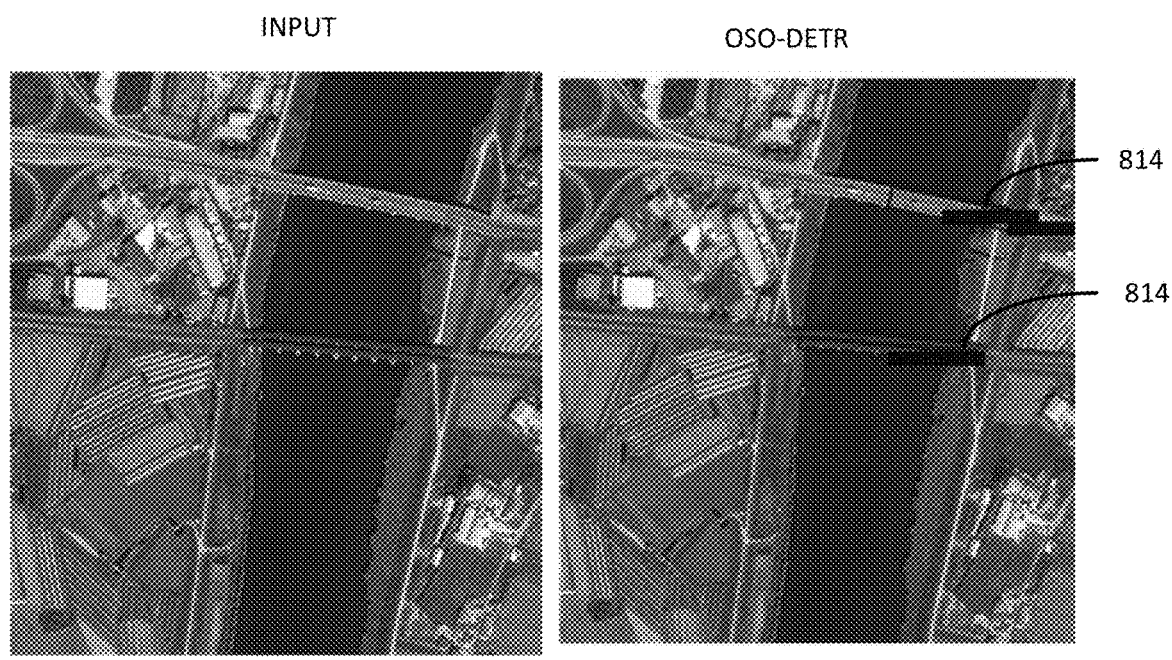
Figure 8I:
Figure 8I:
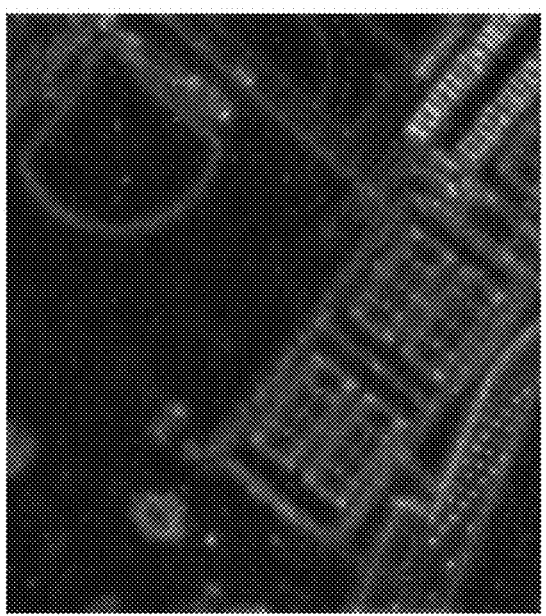
Figure 8J:
Figure 8J:
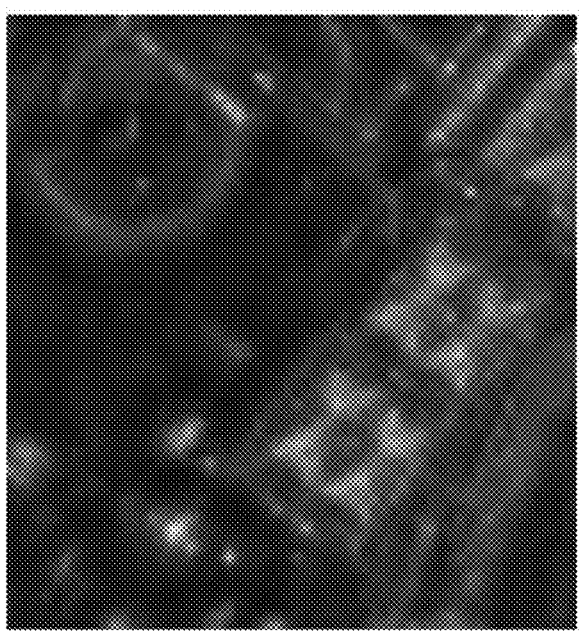
Figure 8K:
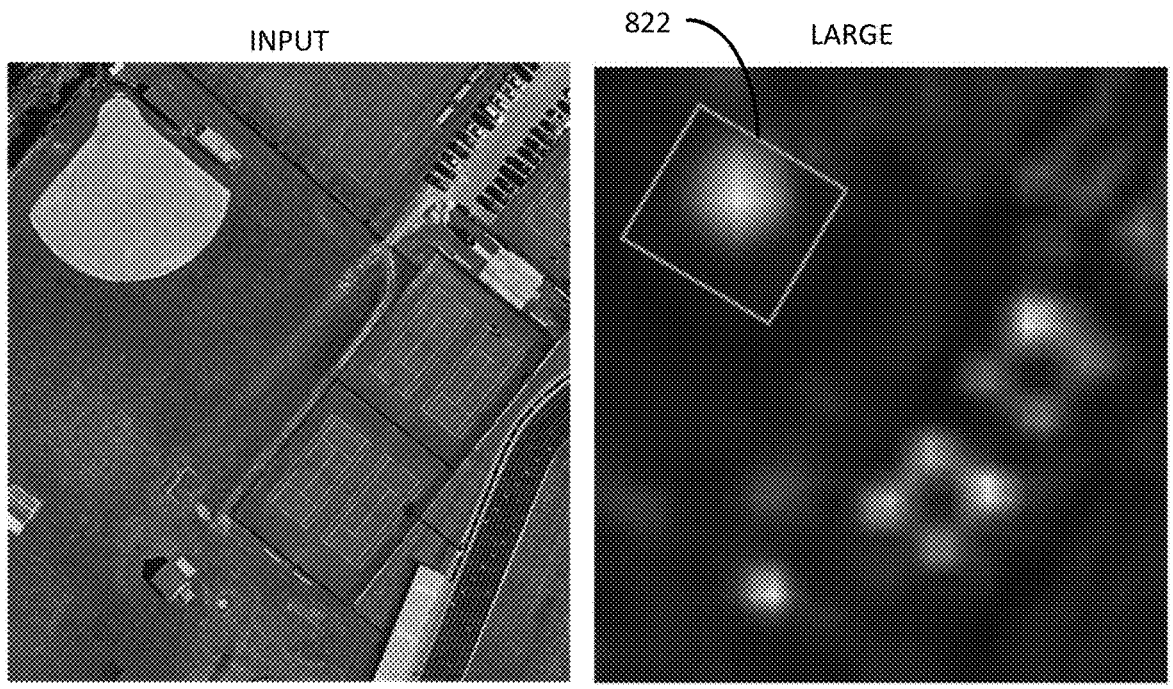
Figure 8L:
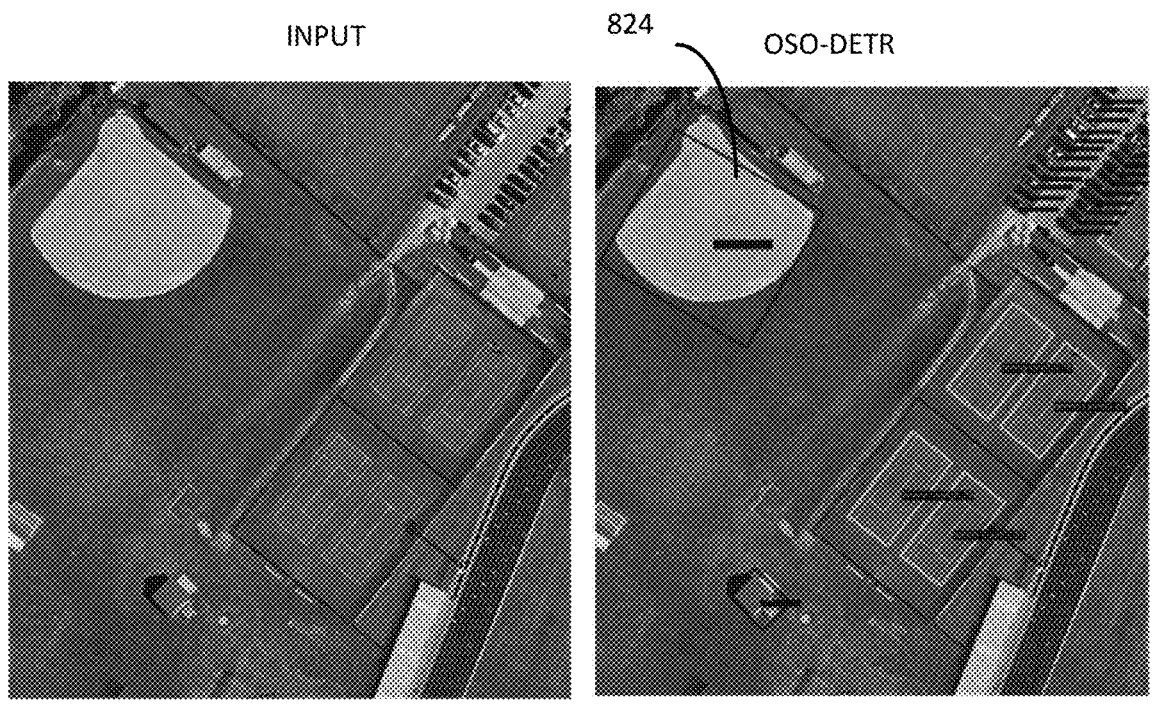
Figure 8M:
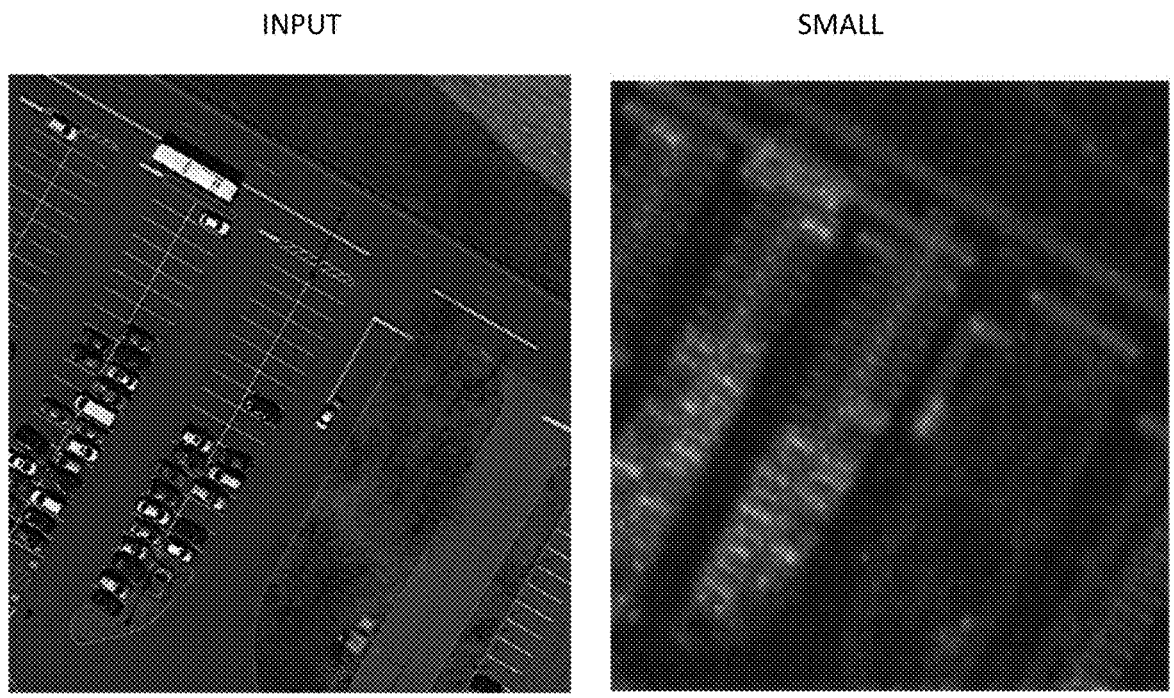
Figure 8N:
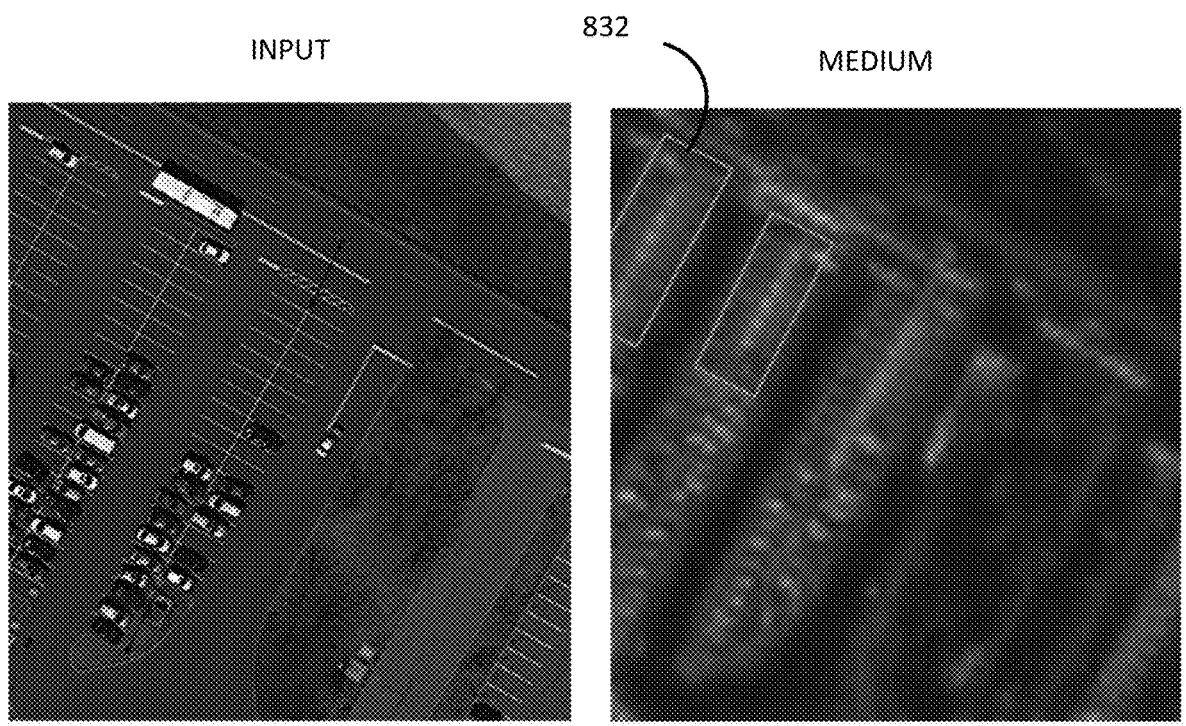
Figure 8O:
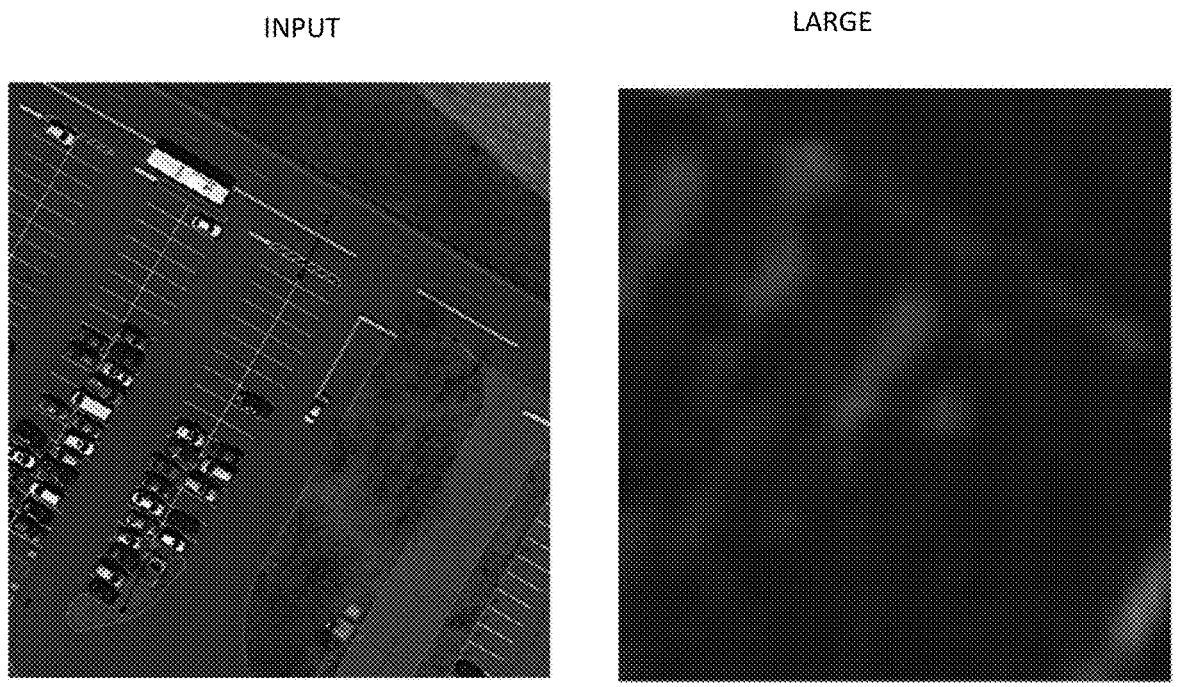
Figure 8P:
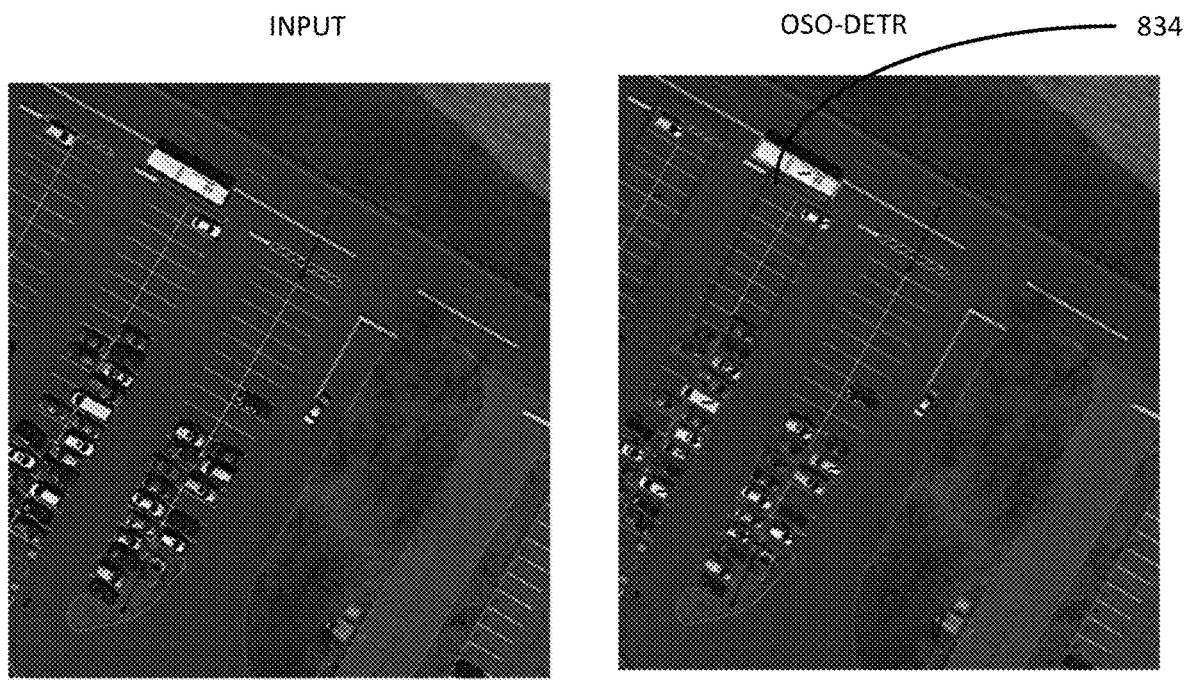

Qualitative results: An additional comparison between Baseline and OSO-DETR utilizing the RaPPL scheme which enhances performance on unknown object detection and pseudo-labeling is shown in FIGS. 8A-8P. Each column corresponds to an example showing test image followed by recall (U-Recall). For a fair comparison in the OWOD setting, a comparison is with previously introduced ORE and OW-DETR. A comparison is made with OSO-DETR being trained only on 50% and 25% partially labeled data under semi-supervised incremental learning strategy. The OSO-DETR achieves improved U-Recall over OW-DETR across tasks, indicating the present model's ability to better detect unknown instances showing the significance of the RaPPL scheme. Moreover, OSO-DETR also obtains significant gains in mAP for known classes across all tasks. Since all classes are known, U-Recall is not calculated for the final task.

TABLE 6

Reports state-of-the-art comparison for open-world object detection (OWOD) on MS-COCO split. The comparison is shown in terms of known class mAP and unknown class recall (U-Recall).

| | Task-1 | Task-2 | | | | Task-3 | | | | Task-4 | | |
|---|---|---|---|---|---|---|---|---|---|---|---|---|
| | mAP | mAP | | | | mAP | | | | mAP | | |
| Task IDs | U-Recall Previously Known | U-Recall | Previously Known | Current Known | Both | U-Recall | Previously Known | Current Known | Both | Previously Known | Current Known | Both |
| ORE-EBUI | 1.5  61.4 | 3.9 | 56.5 | 26.1 | 40.6 | 3.6 | 38.7 | 23.7 | 33.7 | 33.6 | 26.3 | 31.8 |
| OW-DETR | 5.7  71.5 | 6.2 | 62.8 | 27.5 | 43.8 | 6.9 | 45.2 | 24.0 | 38.5 | 38.2 | 28.1 | 33.1 |
| OSO-DETR (100% data) | 8.7  71.2 | 8.3 | 62.0 | 29.2 | 44.8 | 10.5 | 45.4 | 25.3 | 38.7 | 39.2 | 28.2 | 36.5 |
| OSO-DETR (50% data) | —  — | 8.7 | 59.7 | 25.9 | 42.0 | 12.8 | 44.2 | 23.8 | 37.4 | 35.5 | 26.4 | 33.2 |
| OSO-DETR (25% data) | —  — | 7.1 | 54.8 | 23.0 | 38.1 | 12.5 | 40.3 | 19.4 | 33.3 | 31.8 | 22.4 | 29.4 |

Figure 10A:
FIGS. 10A-10C illustrate qualitative comparison between OW-DETR and the present OSO-DETR.
Figure 10A:
Figure 10B:
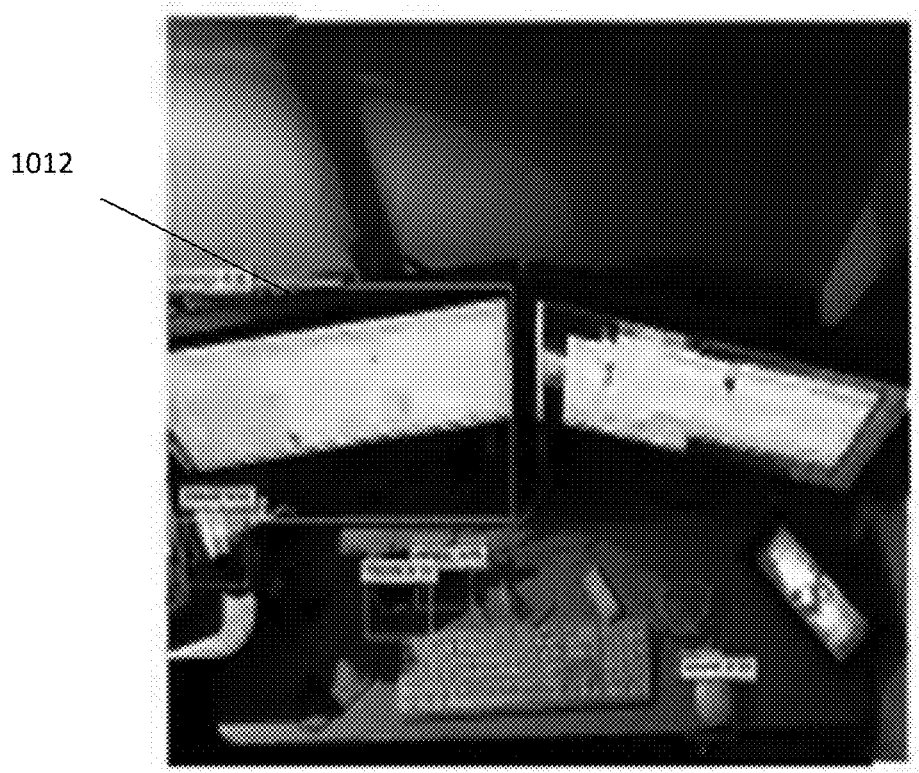
Figure 10B:
Figure 10C:
Figure 10C:
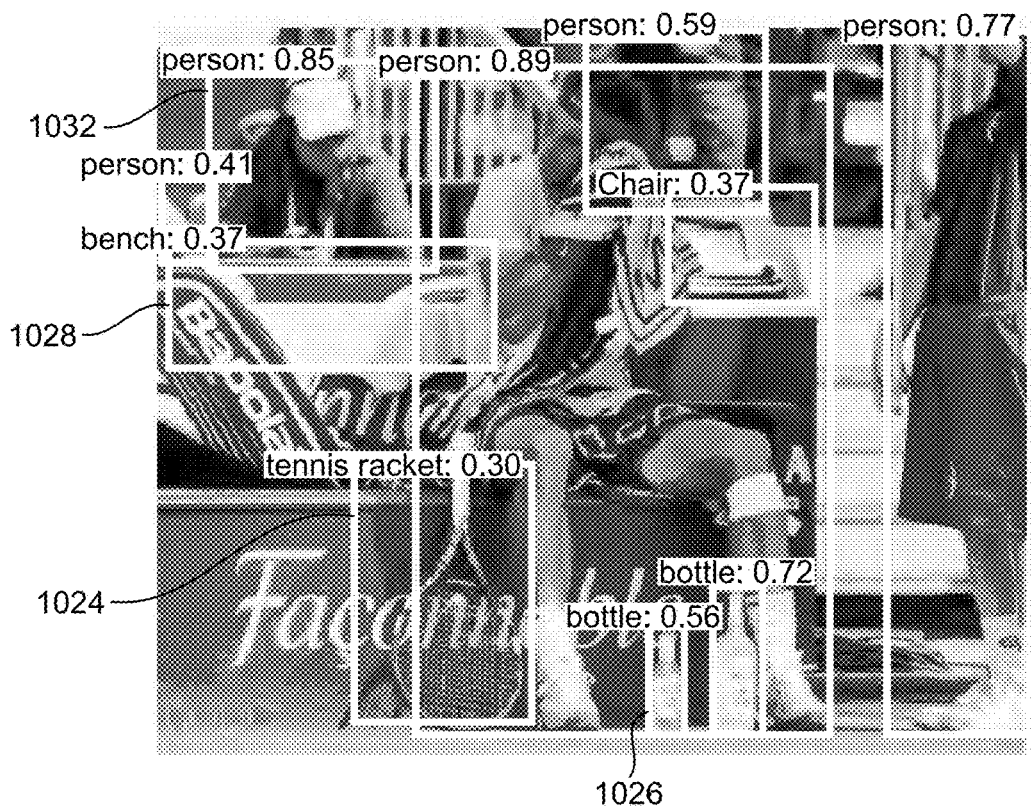

Qualitative comparison on MS COCO: A comparison of qualitative results on MS COCO split between OW-DETR (top) and OSO-DETR (bottom) is shown in FIGS. 10A-10C. In the first example, in FIG. 10A, OW-DETR wrongly detects snowboard 1002 as skis while also being unable to localize properly whereas the OSO-DETR accurately detects snowboard 1004 introduced in the previous task, task-3, with a tight bounding box. In the second example, in FIG. 10B, OW-DETR misses detecting keyboard and one instance of monitor while OSO-DETR detects all instances of these objects 1012, 1014, 1016. In the last example, in FIG. 10C, OW-DETR obtains false detections of person 1022 (task-1 category) on the scene text and fails to detect many object classes. The OSO-DETR accurately predicts person 1032 (introduced in task-1), bench 1028 (introduced in task-2), tennis-racket 1024 (introduced in task-3) and bottle 1026 (introduced in task-4) from different tasks without forgetting.

Numerous modifications and variations of the present invention are possible in light of the above teachings. It is therefore to be understood that within the scope of the appended claims, the invention may be practiced otherwise than as specifically described herein.

The invention claimed is:

1. A semi-supervised satellite image object detection system, comprising:
    an input device to input at least one satellite image;
    processing circuitry of a machine learning engine configured with a satellite object detection training component and an object detection inference component, wherein the object detection training component includes a transformer network that detects at least one unknown object in the at least one satellite image, wherein the transformer network includes:
        a rotation-aware pyramidal pseudo-labeling operation that captures scale-specific pyramidal features at oriented box regions for pseudo-labeling unknown objects in the at least one satellite image;
        a semi-supervised learning pipeline to learn, by incremental learning, a new set of object classes to be detected; and
        a prediction head that outputs the at least one satellite image annotated with a predicted object class for an unknown object,
    wherein the input device receives a test satellite image, and the object detection inference component obtains object queries for the test satellite image, predicts labels for objects from known classes, and predicts oriented boxes for the objects; and
    an output device that outputs the predicted labels and corresponding oriented boxes.

2. The semi-supervised satellite image object detection system of claim 1, wherein
    the rotation-aware pyramidal pseudo-labeling operation includes
    receive images having category annotations grouped by box area,
    extract multi-scale backbone features at corresponding resolutions of deep layers for larger box areas and shallower layers for smaller box areas,
    at each backbone feature scale, obtain a 2D spatial objectness map by averaging across multiple channels, and
    for each of a plurality of oriented box proposals, select an objectness map based on box area and determine an objectness score as a probability of having an object within a respective oriented box.

3. The semi-supervised satellite image object detection system of claim 2, wherein the transformer network includes a decoder, and
    wherein the rotation-aware pyramidal pseudo-labeling operation includes a regression branch in the prediction head that takes object query embeddings from the decoder and predicts the oriented box proposals.

4. The semi-supervised satellite image object detection system of claim 2, wherein the transformer network includes a decoder, objectness branch, and novelty branch,
wherein the decoder uses a bipartite matching loss to select a subset of queries of the decoder as positive matches for known classes, and
wherein the rotation-aware pyramidal pseudo-labeling operation receives a remaining of the queries as unmatched oriented boxes and selects the unmatched oriented boxes having a highest objectness score as pseudo class labels, and uses the pseudo class labels to train the objectness and novelty branches.

5. The semi-supervised satellite image object detection system of claim 1, wherein
the semi-supervised learning pipeline trains the transformer network along with its detached model on augmented data and the transformer network learns representations from both unlabeled and labeled satellite image data.

6. The semi-supervised satellite image object detection system of claim 1, wherein
the semi-supervised learning pipeline
first trains the transformer network on a set of known classes;
subsequently incrementally trains the transformer network for new classes using partially annotated satellite image data; and
further trains the transformer network on both labeled and unlabeled satellite image data using a self-supervised learning loss by utilizing a distillation through time strategy.

7. The semi-supervised satellite image object detection system of claim 6, wherein
the semi-supervised learning pipeline performs the distillation through time strategy with a detached model having fixed weights, a current model $M_{cur}$ with learnable weights, and a mapping network G that maps features of the current model to features of the detached model.

8. The semi-supervised satellite image object detection system of claim 7, wherein the semi-supervised learning pipeline performs the distillation using a Barlow Twins loss.

9. The semi-supervised satellite image object detection system of claim 1, further comprising:
a low Earth orbit satellite equipped with an optical sensor for capturing and transmitting as radio waves the at least one satellite image,
wherein the input device converts the radio waves into satellite image data.

10. A method of semi-supervised object detection by a satellite image object detection system having processing circuitry of a machine learning engine configured with a satellite object detection training component and an object detection inference component, wherein the method comprises:
inputting, via an input device, at least one satellite image;
detecting, via a transformer network, at least one unknown object in the at least one satellite image, including
capturing, via a rotation-aware pyramidal pseudo-labeling operation, scale-specific pyramidal features at oriented box regions for pseudo-labeling unknown objects in the at least one satellite image;
incrementally learning, via a semi-supervised learning pipeline, a new set of object classes to be detected;
outputting, via a prediction head, the at least one satellite image annotated with a predicted object class for an unknown object,
receiving, via the input device, a test satellite image;
obtaining, via the object detection inference component, object queries for the test satellite image, predicts labels for objects from known classes;
predicting, via the object detection inference component, oriented boxes for the objects; and
outputting, via an output device, the predicted labels and corresponding oriented boxes.

11. The method of claim 10, further comprising:
the rotation-aware pyramidal pseudo-labeling operation includes receiving, via the rotation-aware pyramidal pseudo-labeling operation, images having category annotations grouped by box area;
extracting multi-scale backbone features at corresponding resolutions of deep layers for larger box areas and shallower layers for smaller box areas;
at each backbone feature scale, obtaining a 2D spatial objectness map by averaging across multiple channels; and
for each of a plurality of oriented box proposals, selecting an objectness map based on box area and determining an objectness score as a probability of having an object within a respective oriented box.

12. The method of claim 11, wherein the transformer network includes a decoder,
wherein the rotation-aware pyramidal pseudo-labeling operation includes a regression branch in the prediction head, the method further comprising:
taking, via the regression branch, object query embeddings from the decoder and predicting the oriented box proposals.

13. The method of claim 11, wherein the transformer network includes a decoder, objectness branch, and novelty branch, the method further comprising:
selecting a subset of queries of the decoder as positive matches for known classes using a bipartite matching loss of the decoder; and
receiving, via the rotation-aware pyramidal pseudo-labeling operation, a remaining of the queries as unmatched oriented boxes and selecting the unmatched oriented boxes having a highest objectness score as pseudo class labels, and training the objectness and novelty branches using the pseudo class labels.

14. The method of claim 10, further comprising:
training, via the semi-supervised learning pipeline, the transformer network along with its detached model on augmented data and the transformer network learns representations from both unlabeled and labeled satellite image data.

15. The method of claim 10, wherein
the semi-supervised learning pipeline
first trains the transformer network on a set of known classes;
subsequently incrementally trains the transformer network for new classes using partially annotated satellite image data; and
further trains the transformer network on both labeled and unlabeled satellite image data using a self-supervised learning loss by utilizing a distillation through time strategy.

16. The method of claim 15, further comprising:
performing, via the semi-supervised learning pipeline, the distillation through time strategy with a detached model having fixed weights, a current model $M_{cur}$ with learnable weights, and a mapping network G that maps features of the current model to features of the detached model.

17. The method of claim 16, further comprising:
performing, via the semi-supervised learning pipeline, the distillation using a Barlow Twins loss.

18. A non-transient storage medium storing program instructions, which when executed, perform a method of semi-supervised object detection by a satellite image object detection system having processing circuitry of a machine learning engine configured with a satellite object detection training component and an object detection inference component, wherein the method comprises:
inputting, via an input device, at least one satellite image;
detecting, via a transformer network, at least one unknown object in the at least one satellite image, including
capturing, via a rotation-aware pyramidal pseudo-labeling operation, scale-specific pyramidal features at oriented box regions for pseudo-labeling unknown objects in the at least one satellite image;
incrementally learning, via a semi-supervised learning pipeline, a new set of object classes to be detected;
outputting, via a prediction head, the at least one satellite image annotated with a predicted object class for an unknown object,
receiving, via the input device, a test satellite image;
obtaining, via the object detection inference component, object queries for the test satellite image, predicts labels for objects from known classes;
predicting, via the object detection inference component, oriented boxes for the objects; and
outputting, via an output device, the predicted labels and corresponding oriented boxes.

19. The non-transient storage medium of claim 18, further comprising:
the rotation-aware pyramidal pseudo-labeling operation includes
receiving, via the rotation-aware pyramidal pseudo-labeling operation, images having category annotations grouped by box area;
extracting multi-scale backbone features at corresponding resolutions of deep layers for larger box areas and shallower layers for smaller box areas;
at each backbone feature scale, obtaining a 2D spatial objectness map by averaging across multiple channels; and
for each of a plurality of oriented box proposals, selecting an objectness map based on box area and determining an objectness score as a probability of having an object within a respective oriented box.

20. The non-transient storage medium of claim 18, wherein
the semi-supervised learning pipeline
first trains the transformer network on a set of known classes;
subsequently incrementally trains the transformer network for new classes using partially annotated satellite image data; and
further trains the transformer network on both labeled and unlabeled satellite image data using a self-supervised learning loss by utilizing a distillation through time strategy.

* * * * *